United States Patent
Wang

(10) Patent No.: US 11,007,973 B2
(45) Date of Patent: May 18, 2021

(54) WEBBING-BUCKLING DEVICE OF A MULTI-POINT SEAT BELT SYSTEM

(71) Applicant: Liang-Hsiung Wang, Tainan (TW)

(72) Inventor: Liang-Hsiung Wang, Tainan (TW)

( * ) Notice: Subject to any disclaimer, the term of this patent is extended or adjusted under 35 U.S.C. 154(b) by 0 days.

(21) Appl. No.: 16/532,851

(22) Filed: Aug. 6, 2019

(65) Prior Publication Data

US 2020/0070770 A1 Mar. 5, 2020

(30) Foreign Application Priority Data

Sep. 5, 2018 (TW) .................................. 107131139

(51) Int. Cl.
*B60R 22/12* (2006.01)
*B60R 22/18* (2006.01)
*A44B 11/25* (2006.01)

(52) U.S. Cl.
CPC .......... *B60R 22/18* (2013.01); *A44B 11/2523* (2013.01); *A44B 11/2561* (2013.01); *B60R 22/12* (2013.01); *B60R 2022/1806* (2013.01); *B60R 2022/1818* (2013.01)

(58) Field of Classification Search
CPC .. B60R 22/18; A44B 11/2561; A44B 11/2523
See application file for complete search history.

(56) References Cited

U.S. PATENT DOCUMENTS

| | | | |
|---|---|---|---|
| 2007/0044285 A1 | 3/2007 | Kawamura et al. | |
| 2012/0233822 A1* | 9/2012 | Wang .................. | A44B 11/2546 24/633 |
| 2015/0166005 A1* | 6/2015 | You ........................ | B60R 22/00 24/642 |

(Continued)

FOREIGN PATENT DOCUMENTS

| | | |
|---|---|---|
| CN | 107757546 A | 3/2018 |
| CN | 108437927 A | 8/2018 |
| CN | 108473108 A | 8/2018 |
| DE | 10109868 A1 | 9/2001 |

(Continued)

OTHER PUBLICATIONS

Chinese Office Action and Search Report for counterpart Chinese Application No. 201811066725.5, dated Jul. 1, 2020.
Japanese Office Action and Search Report for counterpart Japanese Application No. 2019-150746, dated Jun. 30, 2020.
Communication From the European Patent Office Regarding a Corresponding Foreign Application, dated Feb. 11, 2020.

*Primary Examiner* — Jason W San
(74) *Attorney, Agent, or Firm* — Rosenberg, Klein & Lee

(57) ABSTRACT

A webbing-buckling device of a multi-point seat belt system has a buckle assembly and a tongue assembly. The buckle assembly has a buckle base having a first frame portion and a webbing-locking member slidably inserted through the first frame portion. The tongue assembly is disposed on the buckle assembly and has a tongue base having a second frame portion and a webbing-fixing member slidably inserted through the second frame portion. One of two webbings is inserted between the first frame portion and the webbing-locking member, and the other webbing is inserted between the second frame portion and the webbing-fixing member. Alternatively, the webbing-buckling device has a buckle assembly and two tongue assemblies disposed on the buckle assembly. Each tongue assembly has a tongue base having a second frame portion and a webbing-fixing member inserted through the second frame portion. The webbings are inserted through the tongue assemblies.

7 Claims, 32 Drawing Sheets

(56) References Cited

U.S. PATENT DOCUMENTS

| | | | |
|---|---|---|---|
| 2015/0272281 A1 | 10/2015 | Xiao | |
| 2016/0272147 A1* | 9/2016 | Fisher | B60R 22/26 |
| 2016/0339869 A1* | 11/2016 | Schmidt | B60R 22/023 |
| 2017/0042293 A1* | 2/2017 | Jin | A44B 11/2561 |
| 2019/0061680 A1* | 2/2019 | Wang | B60R 22/12 |
| 2020/0290555 A1* | 9/2020 | Wang | B60R 22/36 |

FOREIGN PATENT DOCUMENTS

| | | |
|---|---|---|
| JP | 2013-507295 A | 3/2013 |
| JP | 2018-027774 A | 2/2018 |
| JP | 2019-507056 A | 3/2019 |
| WO | 2013-188614 A1 | 12/2013 |
| WO | 2017-126763 A1 | 7/2017 |

* cited by examiner

WEBBING-BUCKLING DEVICE OF A MULTI-POINT SEAT BELT SYSTEM

This application claims the benefit of Taiwan patent application No. 107131139, filed on Sep. 5, 2018, the entire contents of which are incorporated herein by reference.

BACKGROUND OF THE INVENTION

1. Field of the Invention

The present invention relates to a webbing-buckling device of a multi-point seat belt system, and more particularly to a webbing-buckling device that is applied to a seat for various vehicles to provide multiple fixing points.

2. Description of Related Art

Based on high security requirements for various vehicles such as sport utility vehicles, racing cars or tanks, a seat belt system disposed on a vehicle seat may be a multi-point seat belt system, including a four-point type, a five-point type, a six-point type, or a seven-point type. Every occupant in a vehicle can be simultaneously limited by distributed fixing points for being fastened steadily on a seat in the vehicle. When an external force is applied to the vehicle, the occupant can be secured on the seat with a sufficient protective effect.

In a conventional multi-point seat belt system including the four-point type, the five-point type, the six-point type, or the seven-point type, independent webbings are integratedly connected to a buckle assembly, multiple tongues, or a tongue assembly by sewing. Connecting relationships between the webbings and the buckle assembly, the tongues, or the tongue assembly are in a fixed state. The conventional multi-point seat belt system cannot adjust webbing lengths to fasten the occupants of different body shapes easily. The conventional multi-point seat belt system further need several adjustment members disposed on the webbings to adjust webbing lengths for occupants of different sizes. The occupants can be secured on the seat for protection and security.

In use, a webbing-buckling device of the conventional multi-point seat belt system is pushed to a position located about a pelvic center of the occupant. The adjustment members are respectively used to adjust the length of each independent webbing. The operation of the webbing-buckling device of the conventional multi-point seat belt system is inconvenient and time-consuming.

For overcoming the problems as described about the webbing-buckling device of the conventional multi-point seat belt system, the applicant has proposed a multi-point seat belt system for solving the problems as described about the webbing-buckling device of the conventional multi-point seat belt system. The multi-point seat belt system proposed by the applicant has a buckling set, two webbing-locking mechanism, at least one retractor, and two webbings. The buckling set has a buckle assembly and at least one tongue. The at least one tongue is detachably inserted into the buckle assembly. The two webbing-locking mechanisms are respectively connected to the at least one tongue and the buckle assembly, or the two webbing-locking mechanisms are connected to the at least one tongue. The two webbings are inserted into the two webbing-locking mechanisms. An end of each one of the two webbings is connected to a corresponding retractor. Another end of each one of the two webbings is fixed on a side of a seat. When the seat belt system is correctly locked, an inclining locking mechanism disposed in each one of the retractors is locked, or the retractors are locked due to emergency deceleration or brake, the webbings are unidirectionally locked by the webbing-locking mechanism due to the change of the tension of the webbings. The webbings fastened on the occupant are tighter and tighter for restricting the occupant on the seat and increasing the security of the occupant on the seat.

After proposing the multi-point seat belt system, the applicant has been continuously doing researches on the multi-point seat belt system. In a combined structure with the buckling set and the webbing-locking mechanism, a moving member of the webbing-locking mechanism is disposed around a connecting member of the webbing-locking mechanism. A limiting protrusion of the moving member is inserted into a through hole of the connecting member. The multi-point seat belt system proposed by the applicant has some defects, such as complex structure and high manufacturing difficulty. Thus, it is necessary to improve the multi-point seat belt system for increasing the product competitiveness.

To overcome the shortcomings, the present invention provides a webbing-buckling device of a multi-point seat belt system to mitigate or obviate the aforementioned problems.

SUMMARY OF THE INVENTION

The objective of the invention is to provide a webbing-buckling device of a multi-point seat belt system that can solve the problems of the conventional multi-point seat belt system including complex structure and high manufacturing difficulty.

The webbing-buckling device of a multi-point seat belt system is applied to connect to two webbings of the multi-point seat belt system. The webbing-buckling device has a buckle assembly and a tongue assembly.

The buckle assembly has a buckle base, a locking assembly, and a webbing-locking member. The buckle base is made of a rigid material and has a body and a first frame portion. The first frame portion is formed on an end of the body and has a first through hole formed through the first frame portion. The locking assembly is disposed on the body of the buckle base and has a locking mechanism, a pressing member, and a tongue slot. The locking mechanism is disposed on the body of the buckle base. The pressing member is disposed on the locking mechanism. The tongue slot is formed on an end of the locking assembly opposite to the first frame portion. The pressing member selectively drives the locking mechanism to change to an unlocked state. The webbing-locking member is inserted through the first through hole of the first frame portion of the buckle base. The webbing-locking member is able to move relative to the first frame portion for locking one of the two webbings.

The tongue assembly is detachably disposed on the buckle assembly and has a tongue base and a webbing-fixing member. The tongue base is made of a rigid material and has a tongue portion and a second frame portion. The second frame portion is formed on an end of the tongue portion and has a second through hole formed through the second frame portion. The webbing-fixing member is inserted through the second through hole of the second frame portion of the tongue base. The webbing-fixing member is able to move relative to the second frame portion for locking the other one of the two webbings. The tongue portion of the tongue base of the tongue assembly is selectively inserted into the tongue slot of the locking assembly of the buckle assembly for locking.

Alternatively, the webbing-buckling device of a multi-point seat belt system is applied to connect to two webbings of the multi-point seat belt system. The webbing-buckling device has a buckle assembly and two tongue assemblies.

The buckle assembly has a central shell, two tongue slots, a webbing-connecting portion, and a locking assembly. The central shell has two opposite sides and a bottom. The two tongue slots are respectively formed through the two opposite sides of the central shell. The webbing-connecting portion is disposed on the bottom of the central shell. The locking assembly is disposed in the central shell and has a locking mechanism and a pressing member. The locking mechanism is disposed in the central shell. The pressing member is disposed on the locking mechanism. The pressing member selectively drives the locking mechanism to change to an unlocked state.

The two tongue assemblies are detachably disposed on the buckle assembly. Each one of the two tongue assemblies has a tongue base and a webbing-fixing member. The tongue base is made of a rigid material and has a tongue portion and a second frame portion. The second frame portion is formed on an end of the tongue portion and has a second through hole formed through the second frame portion. The webbing-fixing member is inserted through the second through hole of the second frame portion of the tongue base. The webbing-fixing member is able to move relative to the second frame portion.

The two tongue assemblies are able to lock the two webbings respectively. The tongue portions of the tongue bases of the two tongue assemblies are respectively and selectively inserted into the tongue slots of the buckle assembly for locking simultaneously.

The webbing-buckling device is applied to the multi-point seat belt system on a seat of a vehicle. The webbing-buckling device is selectively connected to the two webbings of the multi-point seat belt system. When the webbing-buckling device has one buckle assembly and one tongue assembly, the webbing-locking member is slidably inserted into the first frame portion of the buckle base. The webbing-fixing member is slidably inserted into the second frame portion of the tongue base. One of the two webbings is inserted between the first frame portion of the buckle assembly and the webbing-locking member. The other one of the two webbings is inserted between the second frame portion of the tongue assembly and the webbing-fixing member. The one buckle assembly and the one tongue assembly are connected between the two webbings.

When the webbing-buckling device has one buckle assembly and two tongue assemblies, the webbing-fixing member is inserted through the second frame portion in each one of the two tongue assemblies. The two webbings are respectively inserted through the two tongue assemblies having the webbing-fixing member. The one buckle assembly and the two tongue assemblies are connected between the two webbings. Therefore, the webbing-buckling device is applied between the two webbings of the multi-point seat belt system for providing effects on connecting, height adjusting, and locking.

Furthermore, when the webbing-buckling device is combined by the buckle assembly and the tongue assembly, structure of the webbing-locking member of the buckle assembly and structure of the webbing-fixing member of the tongue assembly are simplified. A first side plate portion and a second side plate portion of the webbing-locking member are respectively located at two opposite sides of the first frame portion. The webbing-locking member is able to slide in the first frame portion. A first side plate portion and a second side plate portion of the webbing-fixing member are respectively located at two opposite sides of the second frame portion. The webbing-fixing member is able to slide in the second frame portion.

Alternatively, the webbing-buckling device is combined by the buckle assembly and the two tongue assemblies. Structures of the webbing-fixing members of the two tongue assemblies are simplified. A first side plate portion and a second side plate portion of each one of the webbing-fixing members are respectively located at two opposite sides of a corresponding second frame portion. Structure of the webbing-buckling device is simplified for ease in manufacturing.

Furthermore, the webbing-buckling device of the multi-point seat belt system is connected to the two webbings of the multi-point seat belt system. When the webbing-buckling device is combined by the buckle assembly and the tongue assembly, a relative position between the webbing-locking member and the first frame portion can be changed by tension of the webbing for locking the webbings unidirectionally and respectively.

When the webbing-buckling device is combined by the buckle assembly and the two tongue assemblies, in each one of the two tongue assemblies, a relative position of the webbing-fixing member and the second frame portion can be changed by tension of the webbing for locking the corresponding webbing unidirectionally and respectively.

A relative position between the webbing-locking member and the first frame portion can be changed. A relative position between the webbing-fixing member and the second frame portion can be changed. Thus, a height of the webbing-locking member relative to a corresponding webbing and a height of the webbing-fixing member relative to the corresponding webbing can be adjusted.

In addition, the two webbings are locked on the webbing-buckling device by the tensions of the two webbings. The webbings fastened on an occupant are tighter and tighter for restricting the occupant on the seat and increasing the security of the occupant on the seat.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 4, a first embodiment of a webbing-buckling device 1A in accordance with the present invention comprises a buckle assembly 10A and a tongue assembly 20A.

Figure 1:
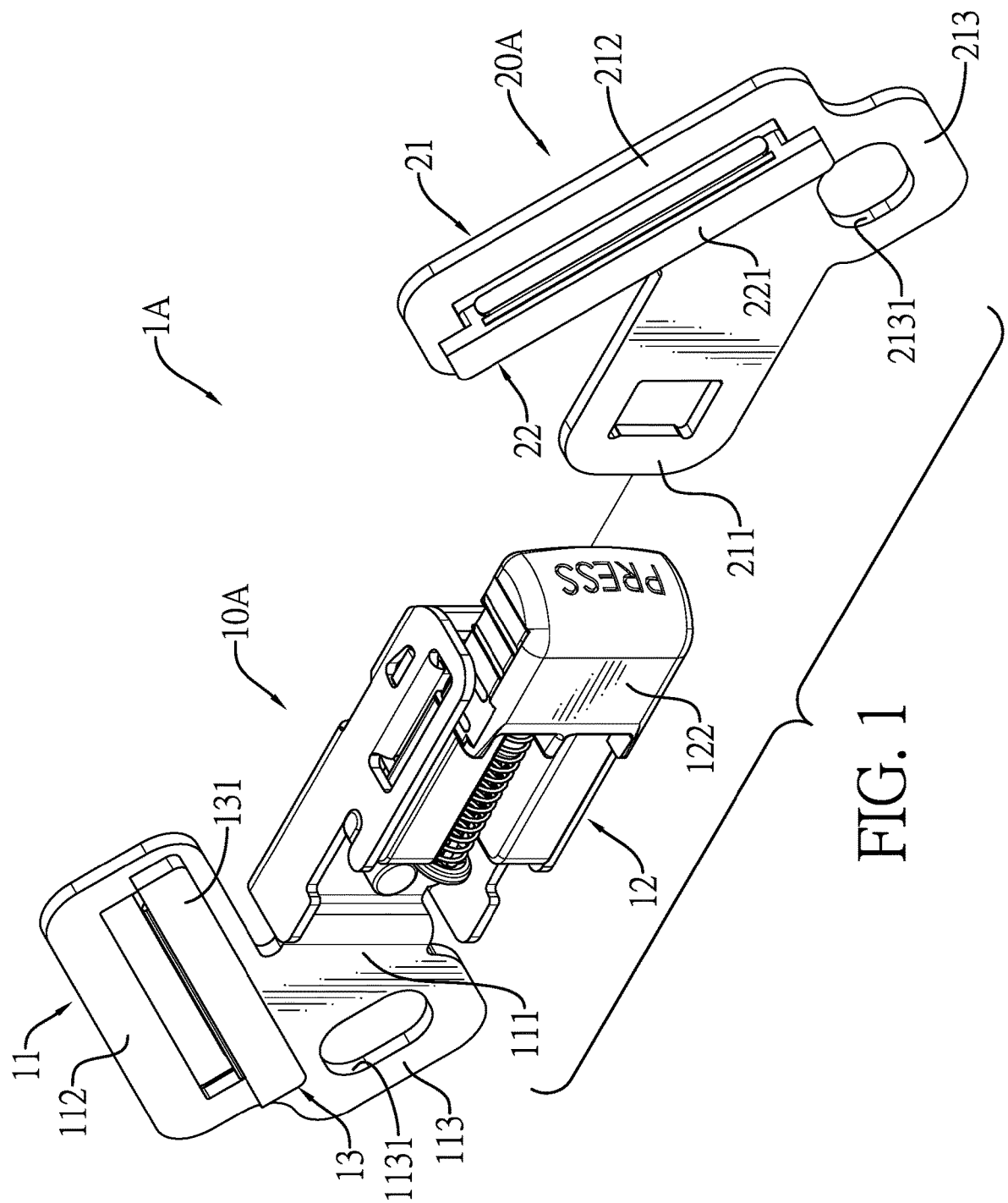
FIG. 1 is an exploded perspective view of a first embodiment of a webbing-buckling device of a multi-point seat belt system in accordance with the present invention, showing the webbing-buckling device is unlocked.
Figure 2:
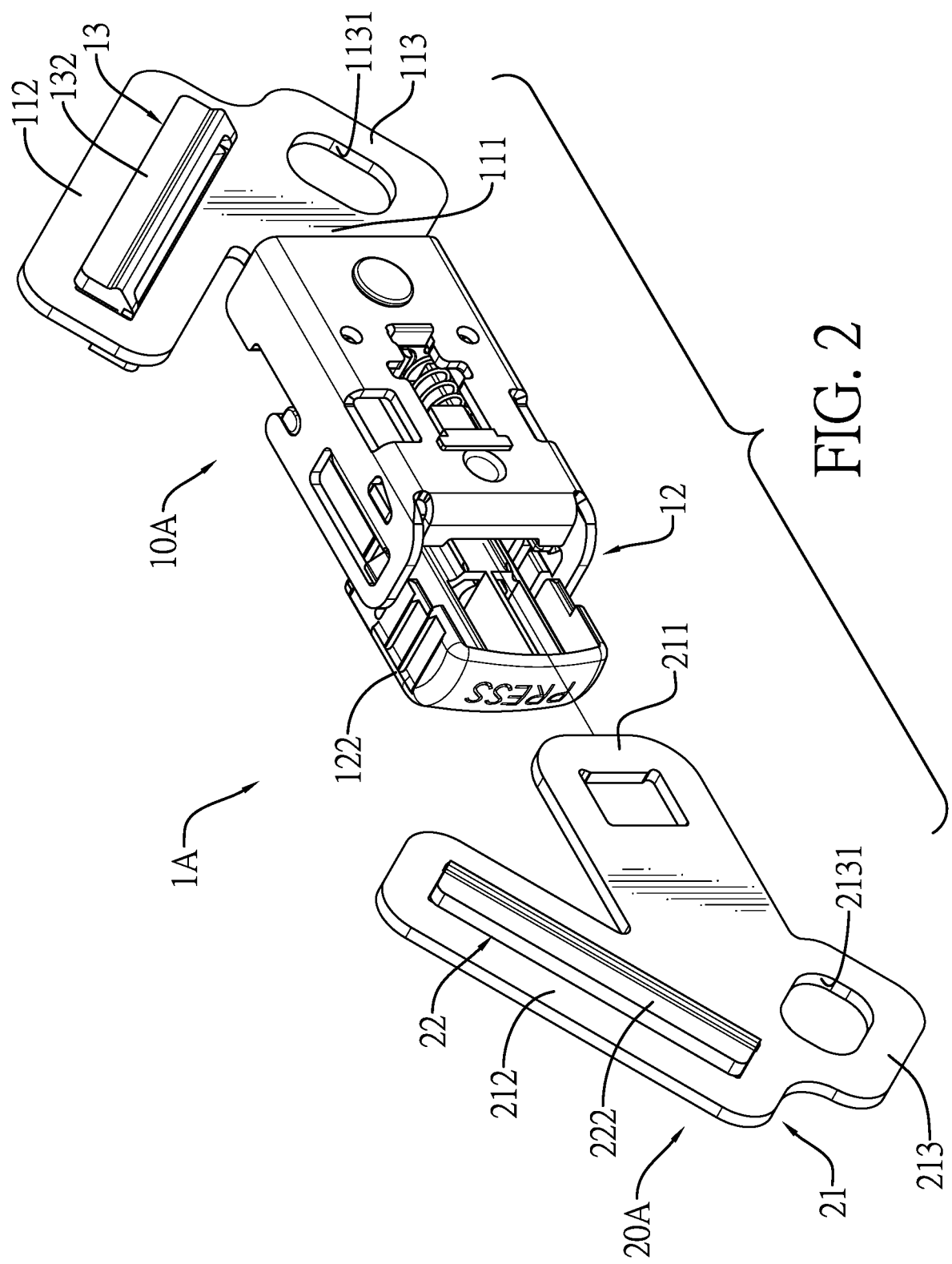
FIG. 2 is another exploded perspective view of the webbing-buckling device in FIG. 1.
Figure 3:
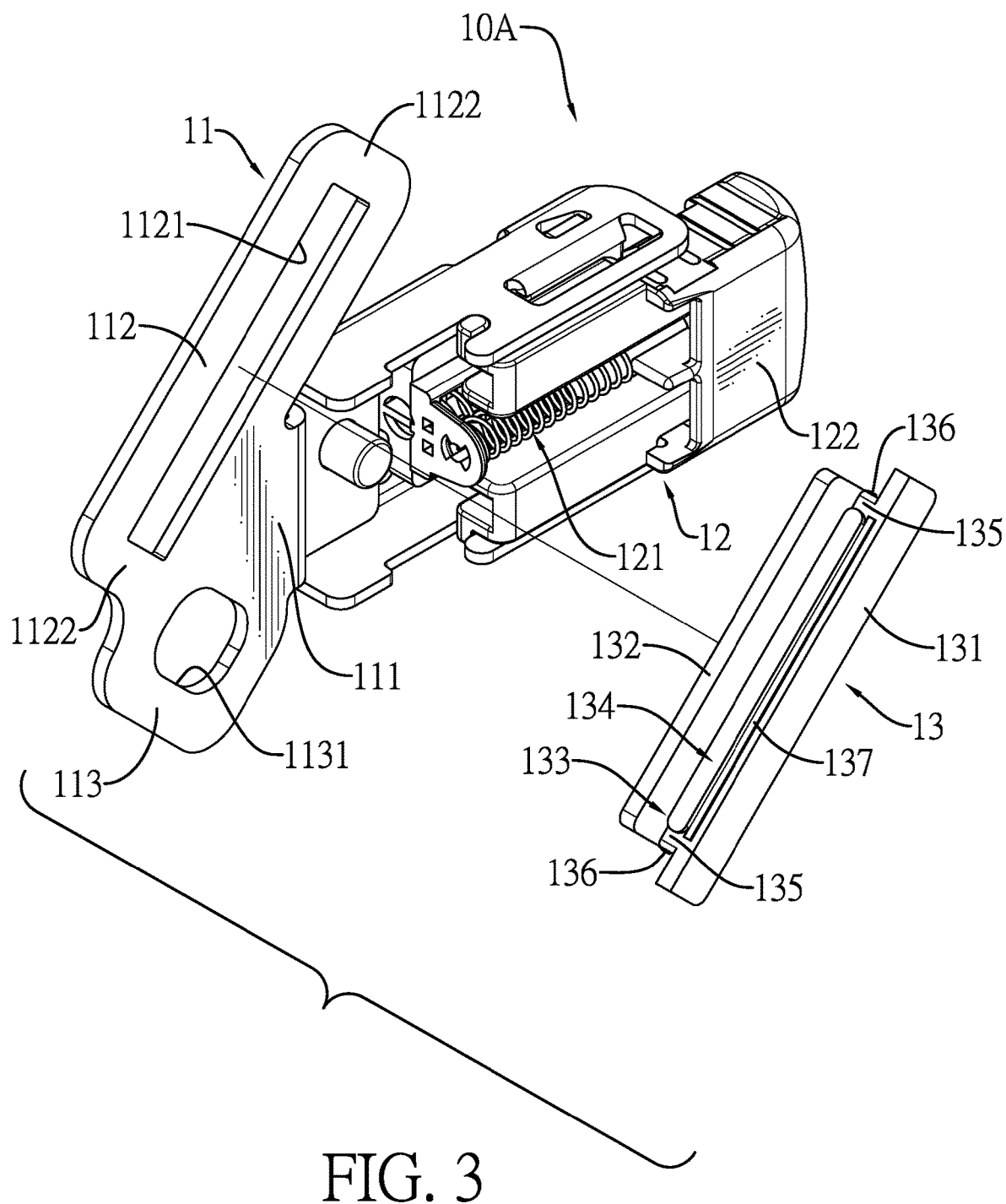
FIG. 3 is an enlarged and exploded perspective view of a buckle assembly of the webbing-buckling device in FIG. 1.
Figure 4:
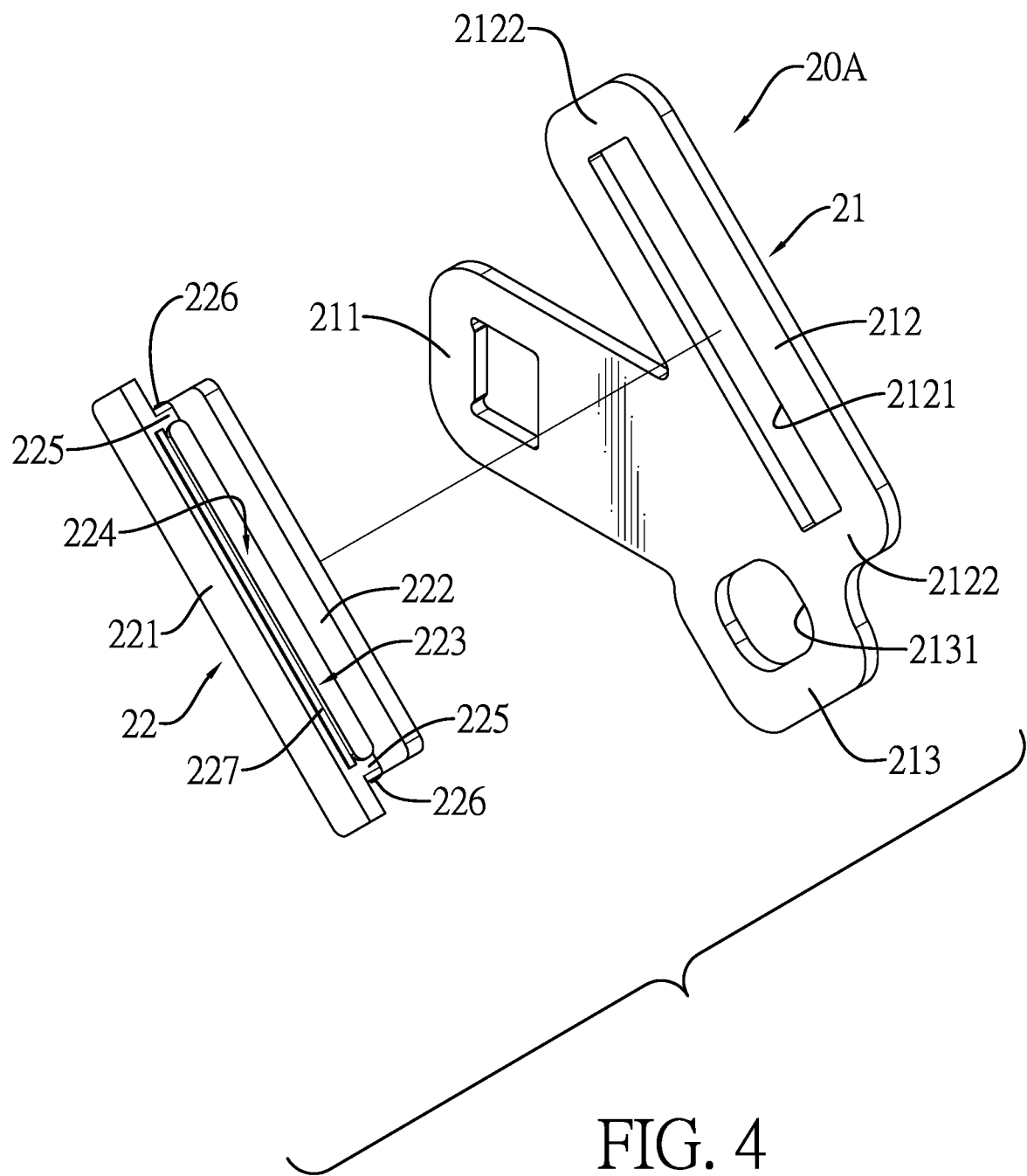
FIG. 4 is another enlarged and exploded perspective view of a tongue assembly of the webbing-buckling device in FIG. 1.

With reference to FIGS. 1 to 3, the buckle assembly 10A has a buckle base 11, a locking assembly 12, and a webbing-locking member 13. The buckle base 11 is made of a rigid material and has a body 111 and a first frame portion 112. The first frame portion 112 is formed on an end of the body 111 and has a first through hole 1121 and two first sides 1122. The first through hole 1121 is formed through the first frame portion 112 and has two ends. The two first sides 1122 are formed on the two ends of the first through hole 1121 respectively.

With reference to FIGS. 1 to 3, and 12, the locking assembly 12 is disposed on the body 111 of the buckle base 11 and has a locking mechanism 121, a pressing member 122, and a tongue slot 111A. The locking mechanism 121 is disposed on the body 111 of the buckle base 11. The pressing member 122 is disposed on the locking mechanism 121. The tongue slot 111A is formed on an end of the locking assembly 12 opposite to the first frame portion 112. The pressing member 122 selectively drives the locking mechanism 121 to change to an unlocked state. The locking assembly 12 can be a known product. The locking assembly 12 is not an improved part in the present invention. Detailed structure of the locking assembly 12 will not be described herein.

With reference to FIGS. 1 to 3, and 13, the webbing-locking member 13 is inserted through the first through hole 1121 of the first frame portion 112 of the buckle base 11. The webbing-locking member 13 is able to move relative to the first frame portion 112. The webbing-locking member 13 has a first side plate portion 131, a second side plate portion 132, and a through portion 133. The first side plate portion 131 and the second side plate portion 132 are opposite to each other at a spaced interval. The first side plate portion 131 and the second side plate portion 132 have a height difference. The through portion 133 is located between the first side plate portion 131 and the second side plate portion 132 and has a through groove 134 and two walls 135. The through groove 134 is downwardly and inclinedly extends from the first side plate portion 131 to the second side plate portion 132 and has two side edges. The two walls 135 are respectively located at the two side edges of the through groove 134 and are both connected to the first side plate portion 131 and the second side plate portion 132. Each one of the two walls 135 has an outer surface and a slide groove 136. The slide groove 136 is formed on the outer surface of each one of the two walls 135, extends longitudinally, and is located between the first side plate portion 131 and the second side plate portion 132. The first side plate portion 131 has a top edge and a flange 137. The flange 137 is formed on and protrudes from the top edge of the first side plate portion 131.

With reference to FIGS. 1 to 3, and 13, in the webbing-locking member 13, the through portion 133 is inserted through the first through hole 1121 of the first frame portion 112. The first side plate portion 131 and the second side plate portion 132 are respectively located at two opposite sides of the first frame portion 112. The two first sides 1122 of the first frame portion 112 are respectively inserted into the slide grooves 136 of the two walls 135 in the webbing-locking member 13. The through portion 133 of the webbing-locking member 13 is limited by the first through hole 1121 of the first frame portion 112. The webbing-locking member 13 is able to slide in the first frame portion 112.

With reference to FIGS. 1 to 4, the tongue assembly 20A is detachably disposed on the buckle assembly 10A and has a tongue base 21 and a webbing-fixing member 22. The tongue base 21 is made of a rigid material and has a tongue portion 211 and a second frame portion 212. The second frame portion 212 is formed on an end of the tongue portion 211 and has a second through hole 2121 and two second sides 2122. The second through hole 2121 is formed through the second frame portion 212 and has two ends. The second sides 2122 are formed on the two ends of the second through hole 2121 respectively.

With reference to FIGS. 1 to 4, 13, and 14, the webbing-fixing member 22 is inserted through the second through hole 2121 of the second frame portion 212 of the tongue base 21. The webbing-fixing member 22 is able to move relative to the second frame portion 212. Structures of the webbing-fixing member 22 and the webbing-locking member 13 are the same.

With reference to FIGS. 1, 2, 4, and 13, the webbing-fixing member 22 has a first side plate portion 221, a second side plate portion 222, and a through portion 223. The first side plate portion 221 and the second side plate portion 222 are opposite to each other at a spaced interval. The first side plate portion 221 and the second side plate portion 222 have a height difference. The through portion 223 is located between the first side plate portion 221 and the second side plate portion 222 and has a through groove 224 and two walls 225. The through groove 224 downwardly and inclinedly extends from the first side plate portion 221 to the second side plate portion 222 and has two side edges. The two walls 225 are respectively located at the two side edges of the through groove 224 and are both connected to the first side plate portion 221 and the second side plate portion 222. Each one of the two walls 225 has an outer surface and a slide groove 226. The slide groove 226 is formed on the outer surface of each one of the two walls 225, extends longitudinally, and is located between the first side plate portion 221 and the second side plate portion 222. The first side plate portion 221 has a top edge and a flange 227. The flange 227 is formed on and protrudes from the top edge of the first side plate portion 221.

With reference to FIGS. 1 to 4, 13, and 14, in the first embodiment, the through portion 223 of the webbing-fixing member 22 is inserted through the second through hole 2121 of the second frame portion 212. The first side plate portion 221 and the second side plate portion 222 are respectively located at two opposite sides of the second frame portion 212. The two second sides 2122 of the second frame portion 212 are respectively inserted into the slide grooves 226 of the two walls 225 in the webbing-fixing member 22. The through portion 223 of the webbing-fixing member 22 is limited by the second through hole 2121 of the second frame portion 212. The webbing-fixing member 22 is able to slide in the second frame portion 212.

With reference to FIGS. 1 to 5, in the first embodiment, the buckle base 11 of the buckle assembly 10A has a first connecting portion 113. The first connecting portion 113 is formed below the first frame portion 112 and has a first connecting hole 1131 formed through the first connecting portion 113. The tongue base 21 of the tongue assembly 20A has a second connecting portion 213. The second connecting portion 213 is formed below the second frame portion 212 and has a second connecting hole 2131 formed through the second connecting portion 213.

Figure 5:
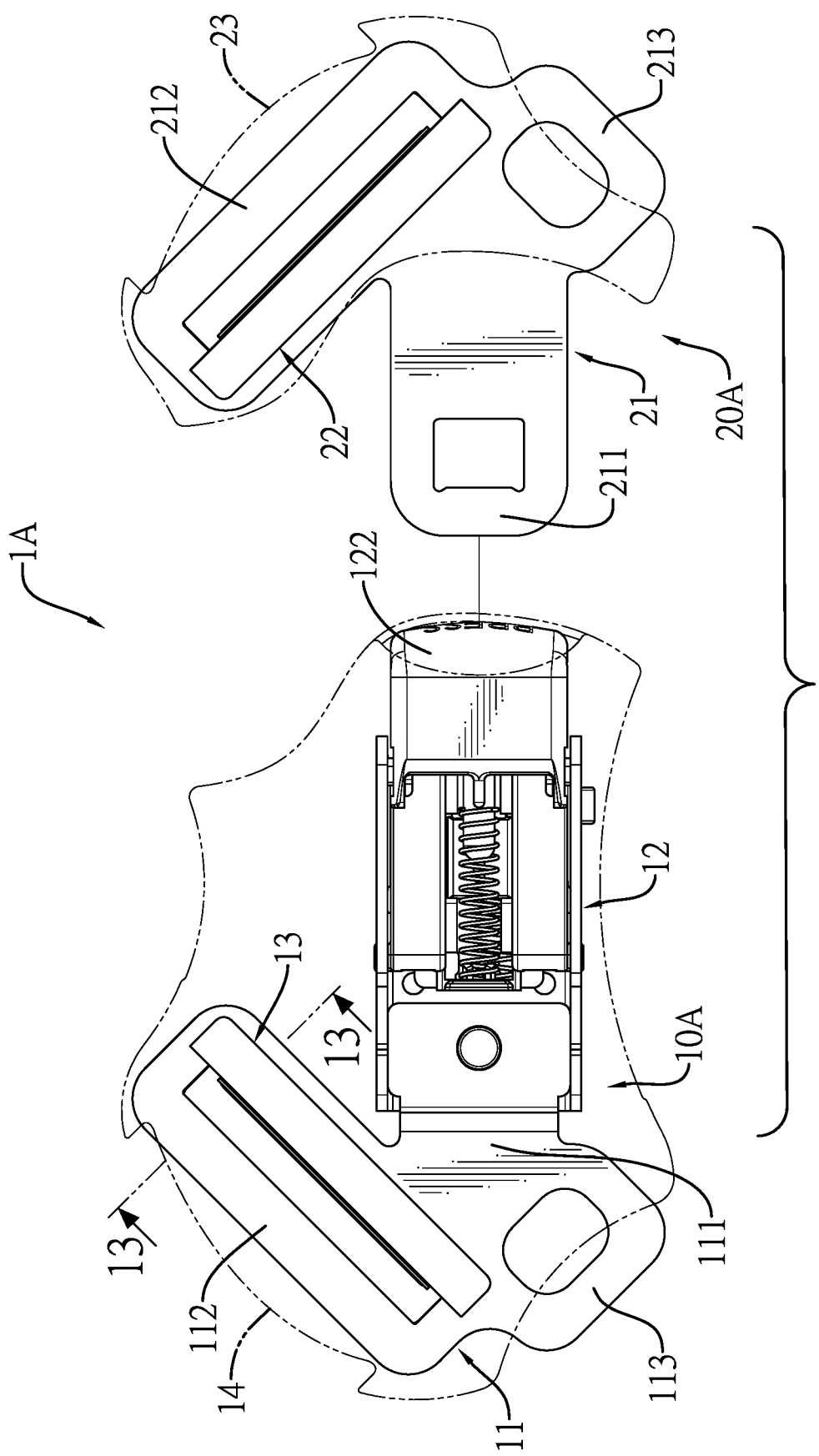
FIG. 5 is a front side view of the webbing-buckling device in FIG. 1, showing an outer shell is disposed around the buckle assembly, and a tongue shell is disposed around the tongue assembly.
Figure 12:
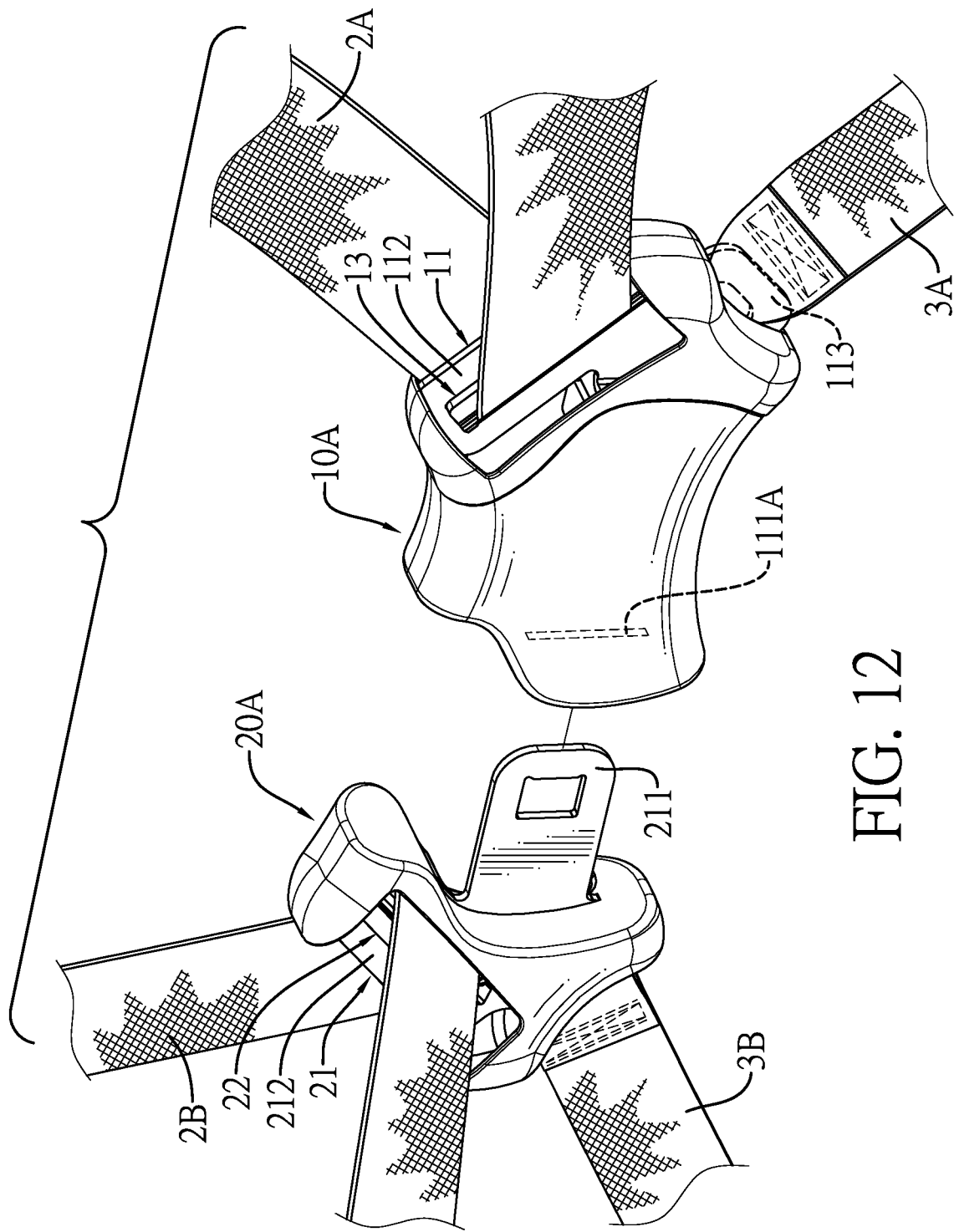
FIG. 12 is another perspective view of the webbing-buckling device in FIG. 10.

With reference to FIG. 5, the buckle assembly 10A has an outer shell 14. The outer shell 14 covers the body 111 of the buckle base 11 and the locking mechanism 121 of the locking assembly 12. With reference to FIG. 12, the buckle assembly 10A further has another tongue slot 111A disposed on a side of the buckle assembly 10A opposite to the first frame portion 112. The tongue portion 211 of the tongue assembly 20A can be inserted into the tongue slot 111A. The tongue assembly 20A has a tongue shell 23. The tongue shell 23 covers the tongue base 21.

Figure 6:
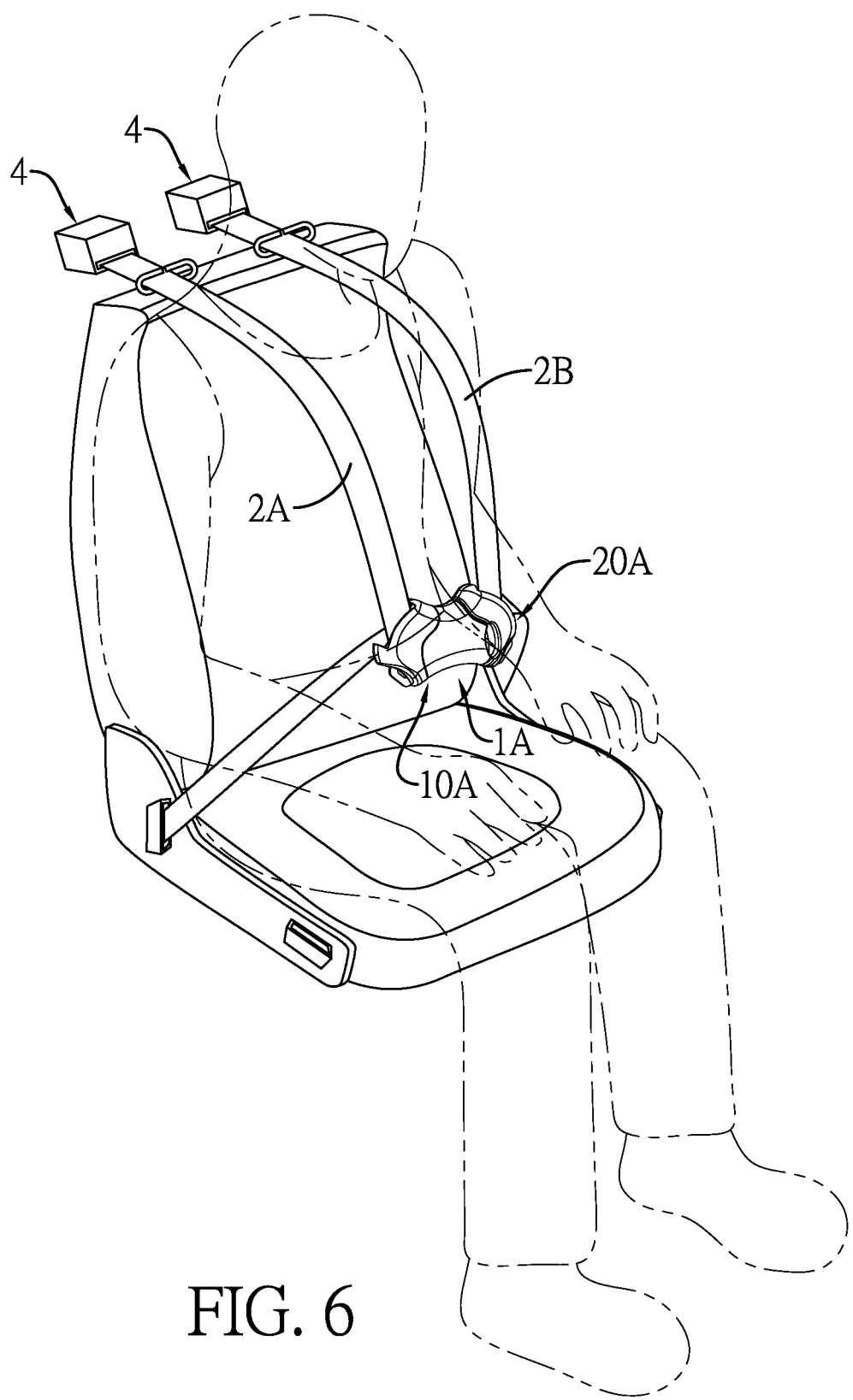
FIG. 6 is an operational perspective view of the webbing-buckling device in FIG. 1, showing the webbing-buckling device is applied to a four-point seat belt system on a seat of a vehicle.
Figure 7:
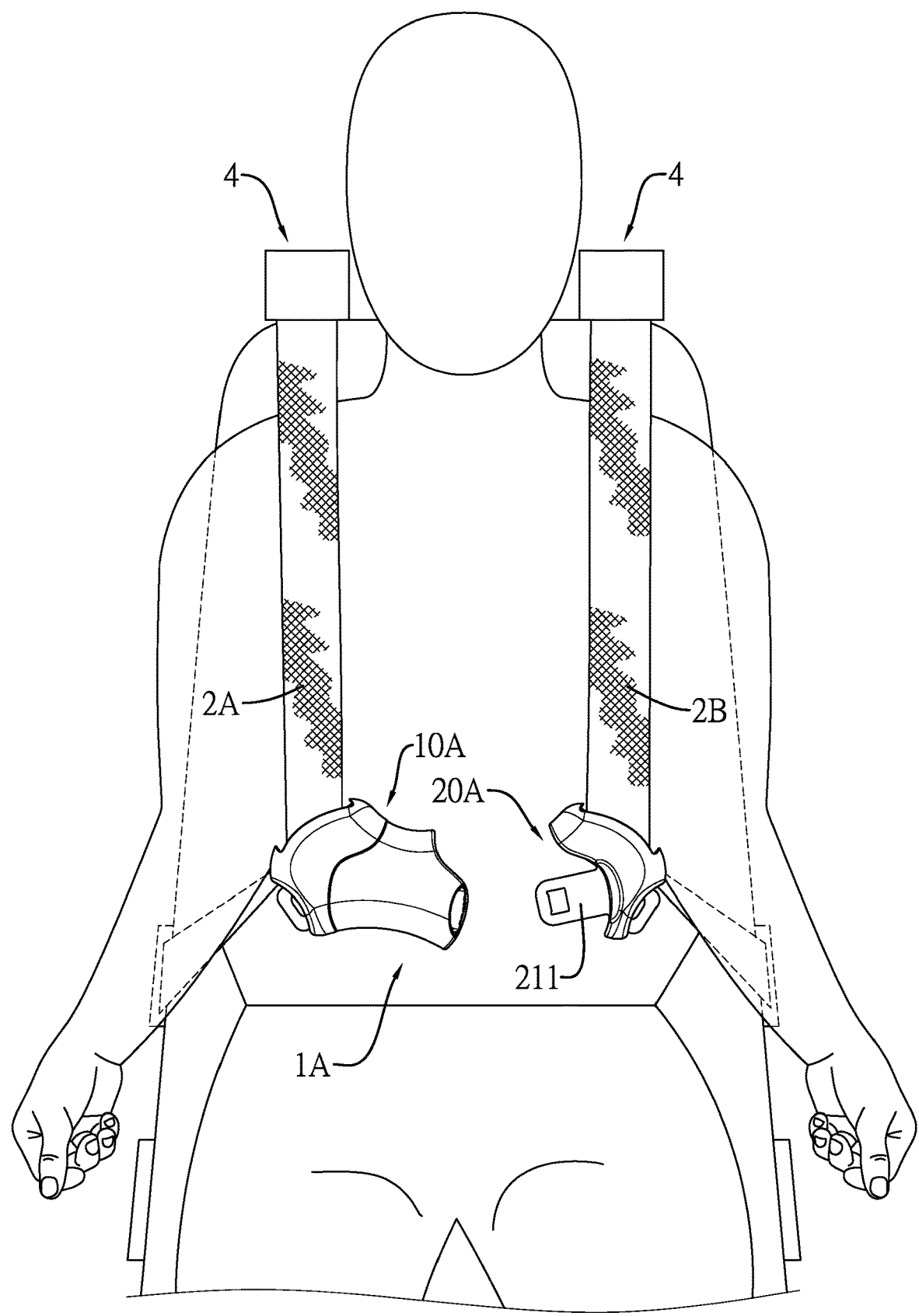
FIG. 7 is a front side view of the webbing-buckling device in FIG. 6, showing the webbing-buckling device is unlocked.
Figure 8:
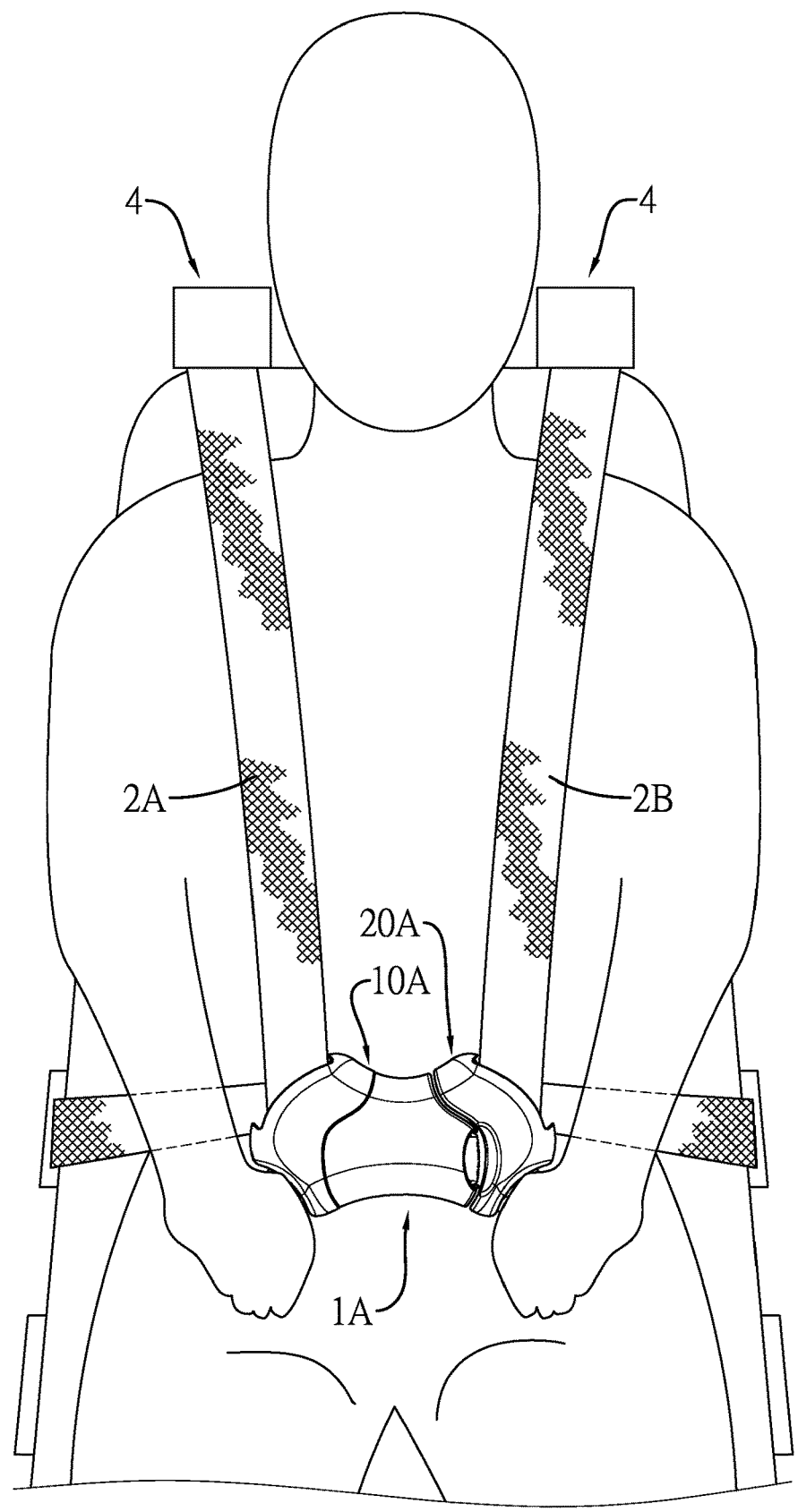
FIG. 8 is a front side view of the webbing-buckling device in FIG. 6, showing the webbing-buckling device is locked.
Figure 9:
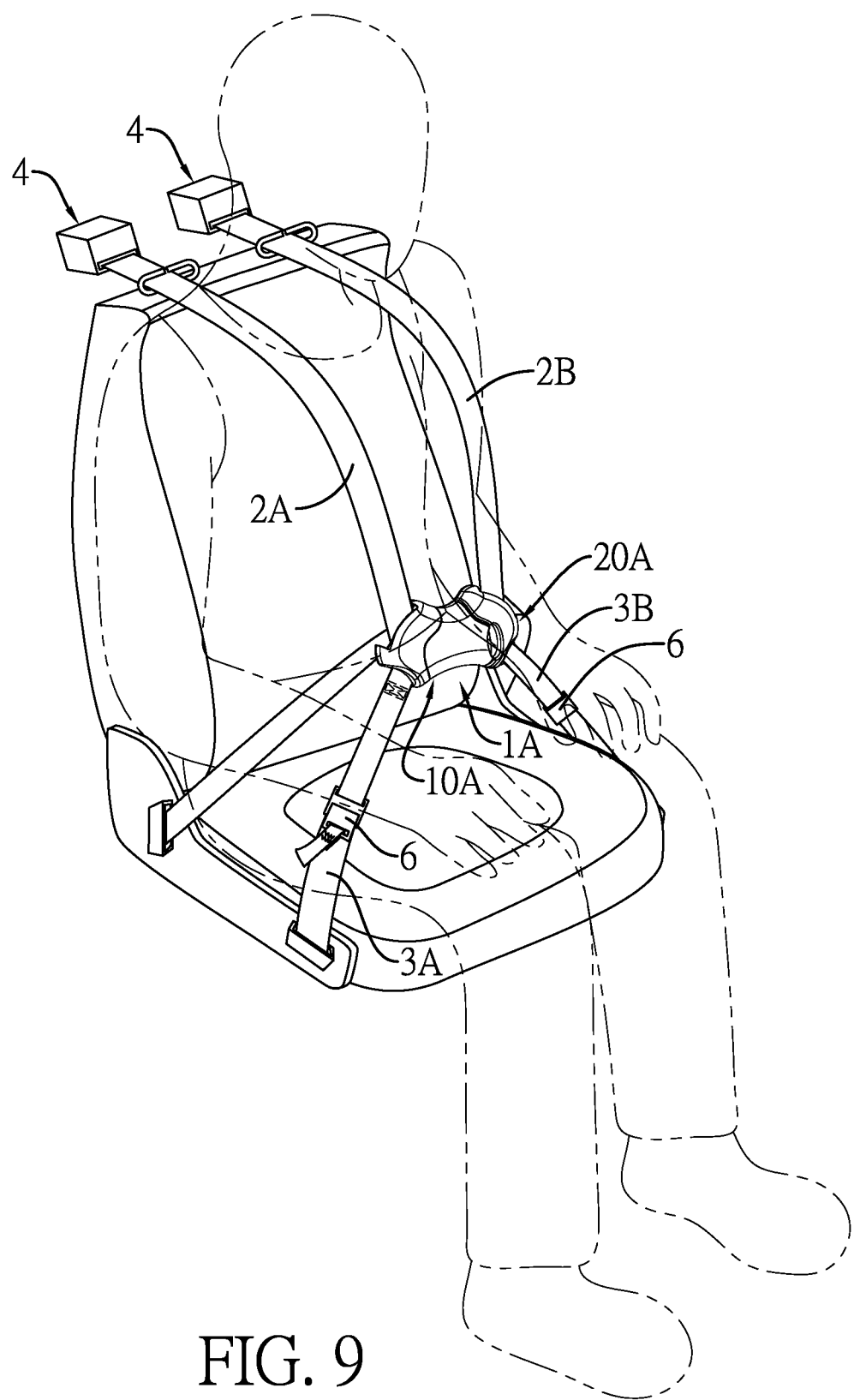
FIG. 9 is another operational perspective view of the webbing-buckling device in FIG. 1, showing the webbing-buckling device is applied to a six-point seat belt system on a seat of a vehicle.
Figure 10:
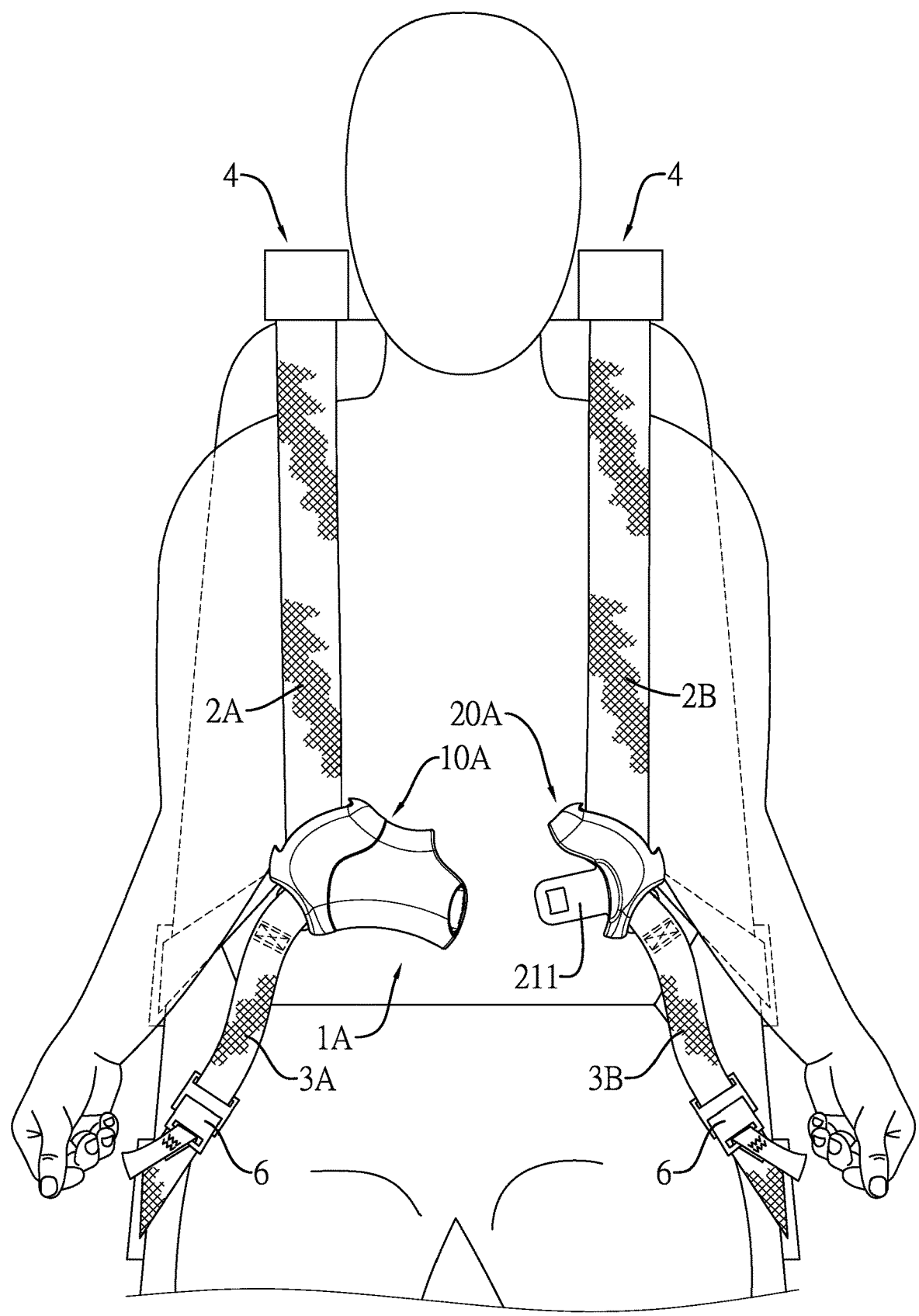
FIG. 10 is a front side view of the webbing-buckling device in FIG. 9, showing the webbing-buckling device is unlocked.
Figure 11:
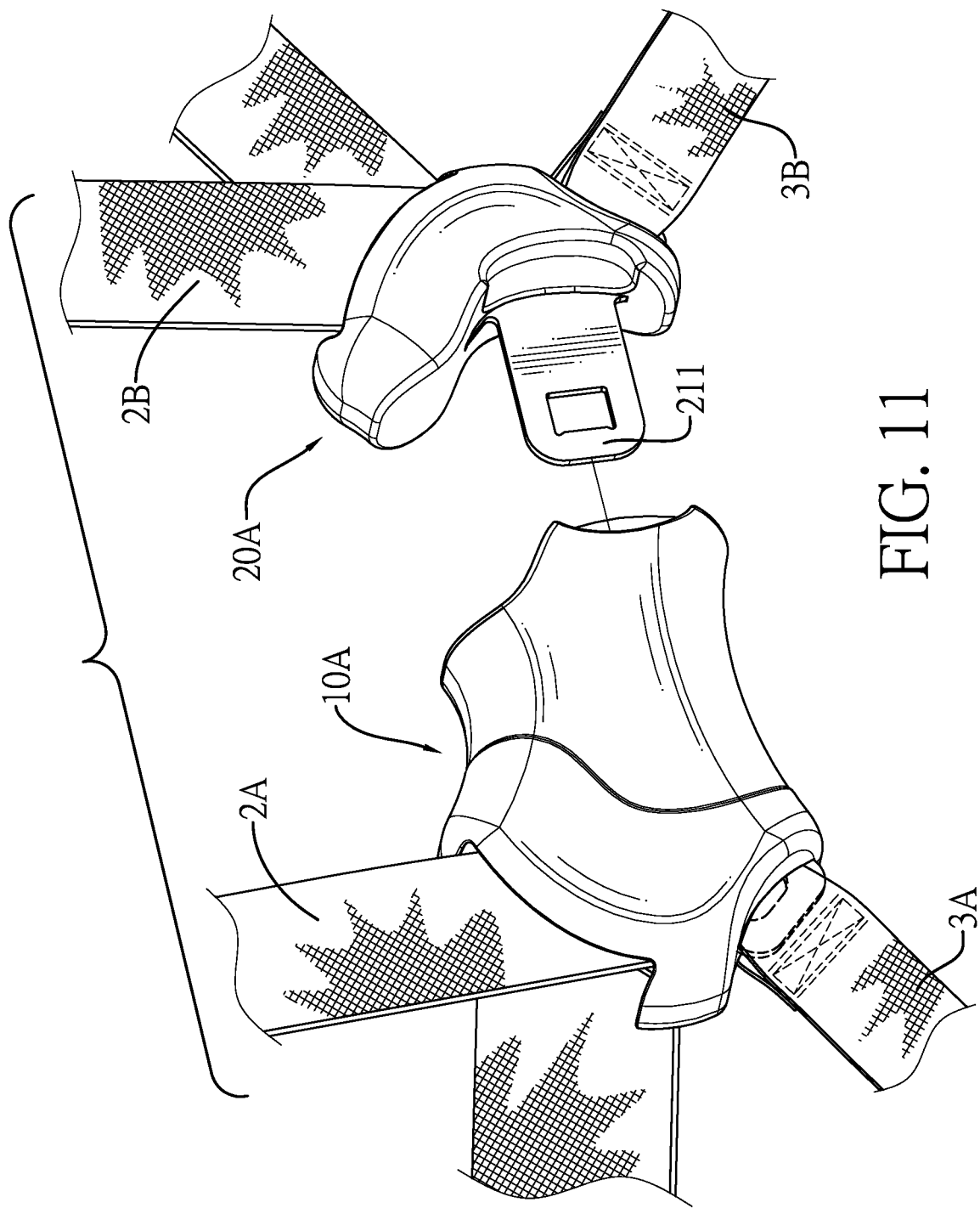
FIG. 11 is an enlarged perspective view of the webbing-buckling device in FIG. 10.
Figure 16:
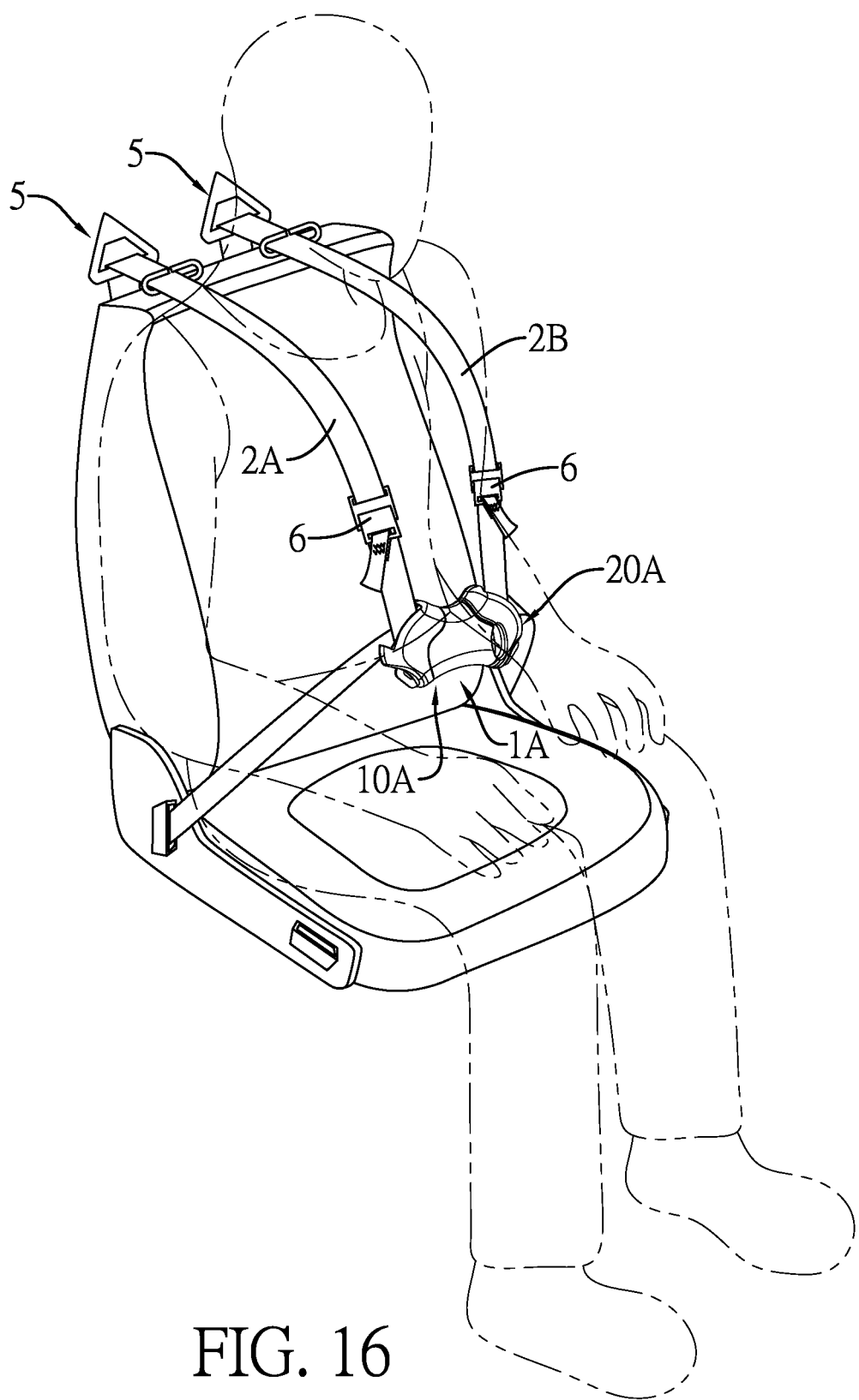
FIG. 16 is an operational perspective view of a four-point seat belt system without a retractor, showing the webbing-buckling device in FIG. 1 is applied to the four-point seat belt system without the retractor.
Figure 17:
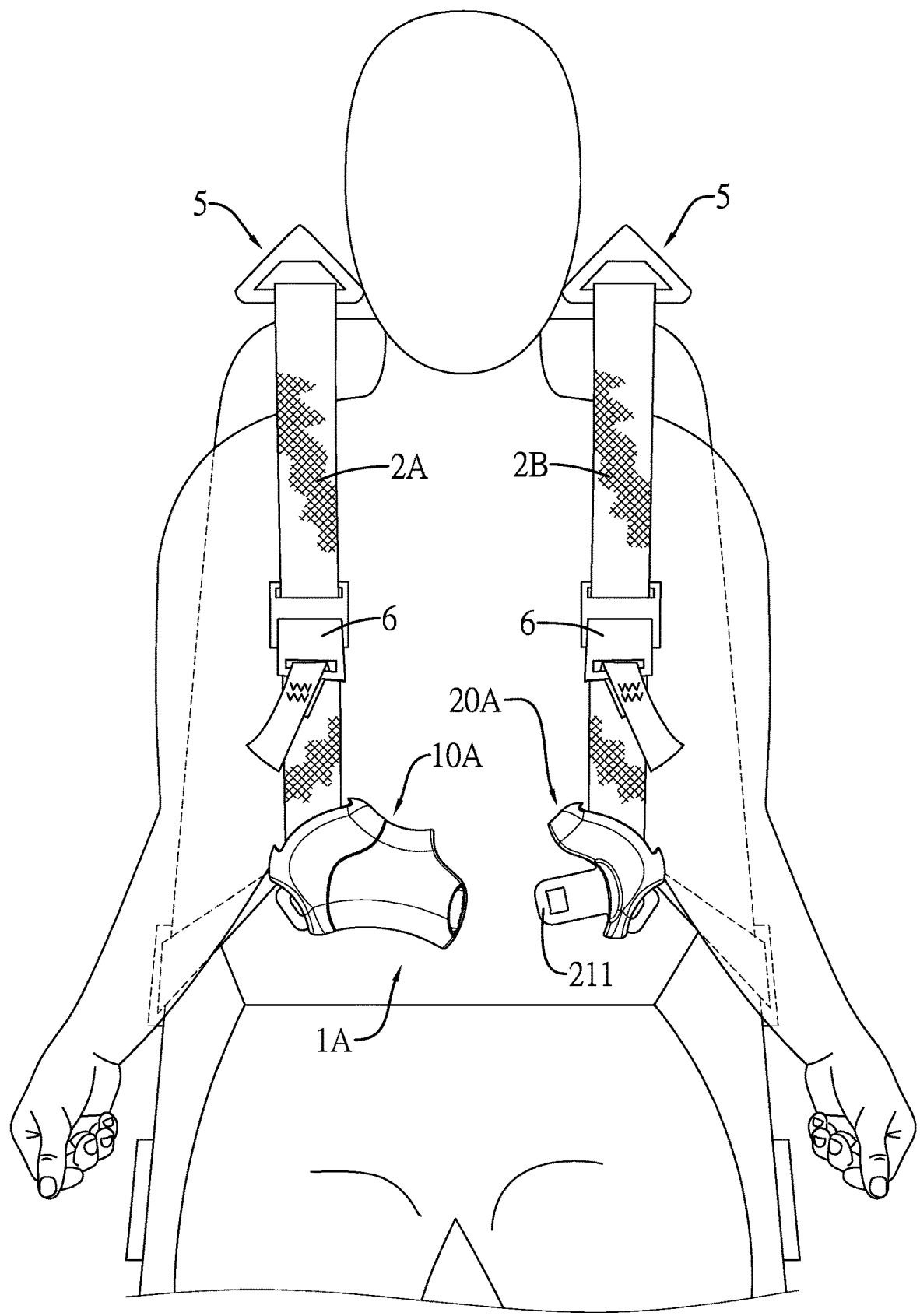
FIG. 17 is a front side view of the four-point seat belt system without the retractor in FIG. 16, showing the webbing-buckling device is unlocked.
Figure 18:
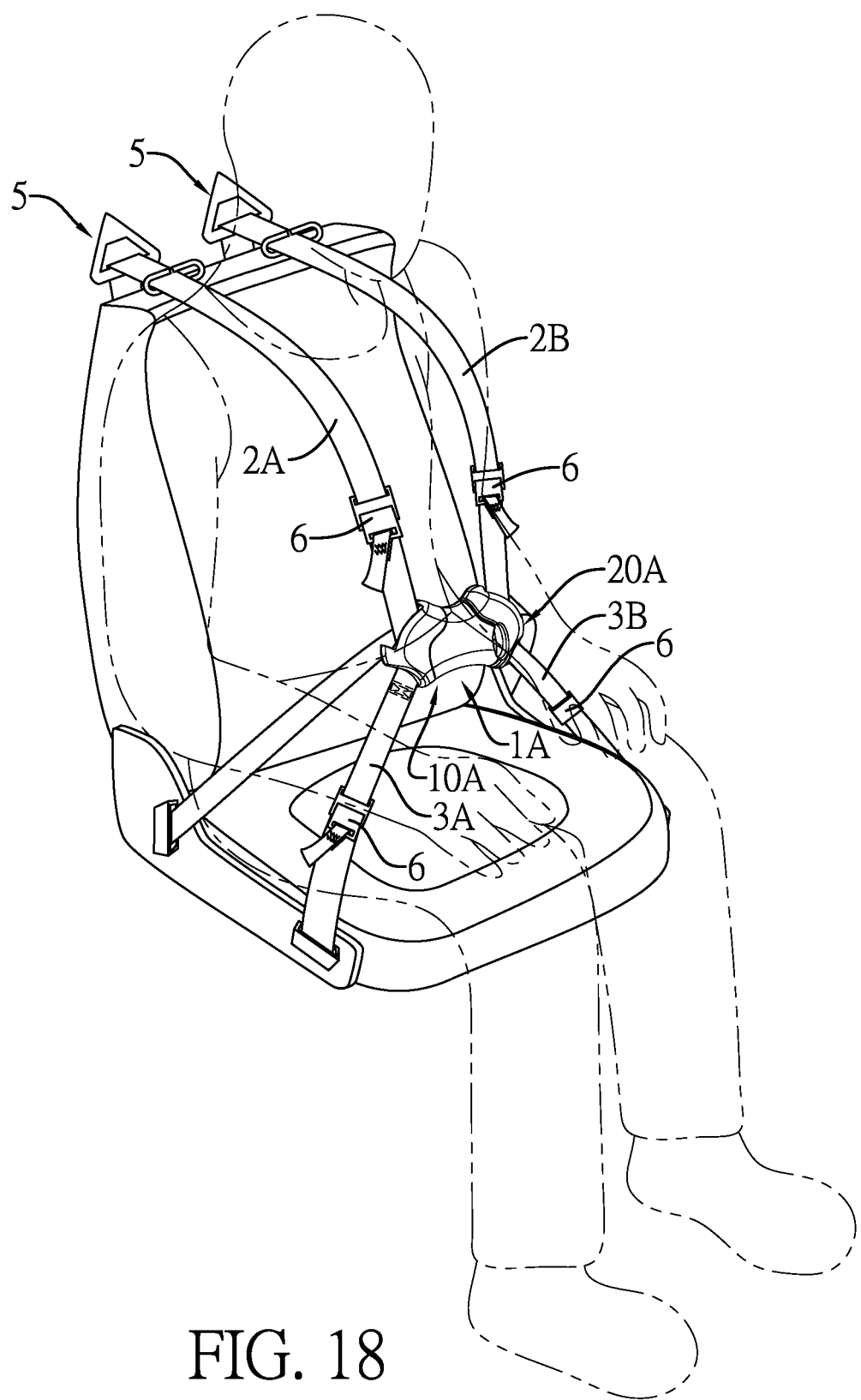
FIG. 18 is an operational perspective view of a six-point seat belt system without a retractor, showing the webbing-buckling device in FIG. 1 is applied to the six-point seat belt system without the retractor.
Figure 19:
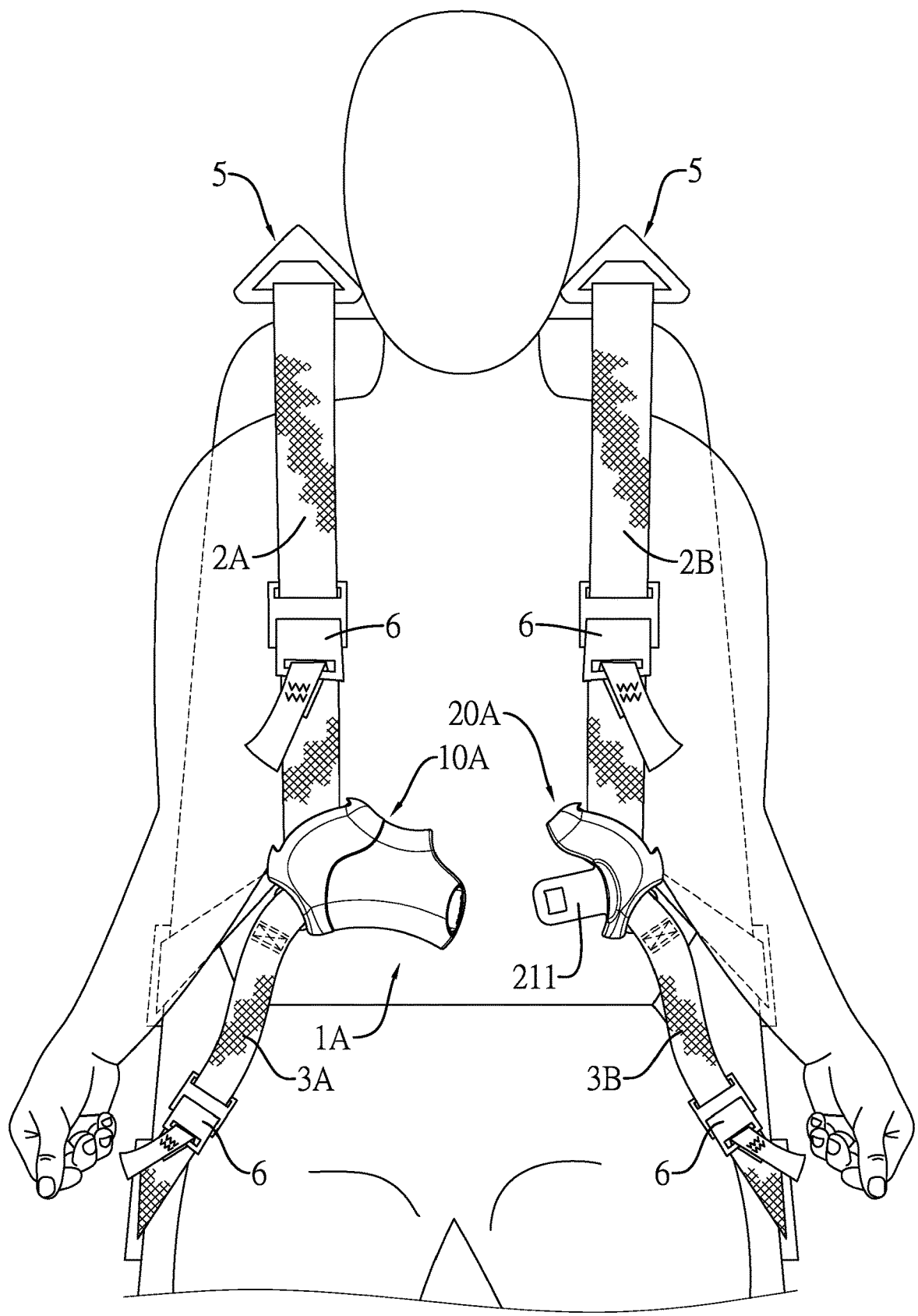
FIG. 19 is a front side view of the six-point seat belt system without the retractor in FIG. 18, showing the webbing-buckling device is unlocked.

With reference to FIGS. 6 and 9, the webbing-buckling device 1A can be applied to a four-point seat belt system or a six-point seat belt system. With reference to FIGS. 16 and 18, the webbing-buckling device 1A can be applied to a four-point seat belt system without a retractor 4 or a six-point seat belt system without a retractor 4.

With reference to FIGS. 6 and 9, the webbing-buckling device 1A can be applied to the four-point seat belt system or the six-point seat belt system having at least one retractor 4. The at least one retractor 4 can be one or two retractors. Each one of the at least one retractor 4 is disposed on a seat back of a seat in a vehicle, can retract a webbing automatically, and has an inclining locking mechanism disposed in each one of the at least one retractor 4. When the vehicle is inclined, the webbing 2A, 2B is locked by the inclining locking mechanism. When the vehicle is urgently decelerated or braked, the at least one retractor 4 is locked for locking the webbing 2A, 2B. The at least one retractor 4 is a known product. Detailed structure of the at least one retractor 4 will not be described herein.

The multi-point seat belt system has one retractor 4 disposed below the seat back of the seat and connected to a Y-shaped webbing member. Two webbings 2A, 2B of the Y-shaped webbing member are respectively inserted through the buckle assembly 10A and the tongue assembly 20A of the webbing-buckling device 1A. Distal ends of the two webbings 2A, 2B are respectively connected to two fixing members located at the opposite back sides of a cushion in the seat. With reference to FIG. 6, the multi-point seat belt system has two retractors 4. The two retractors 4 are respectively disposed on the opposite top-back sides of the seat back and are respectively connected to two webbings 2A, 2B.

With reference to FIGS. 6 and 9, the two webbings 2A, 2B are respectively inserted through the buckle assembly 10A and the tongue assembly 20A of the webbing-buckling device 1A. Distal ends of the two webbings 2A, 2B are respectively connected to the two fixing members located at the opposite back sides of the cushion in the seat to form the six-point seat belt system having six fixing points. With reference to FIG. 9, two auxiliary webbings having adjusting members 6 are respectively disposed on the opposite front sides of the cushion in the seat and are respectively connected to the first connecting portion 113 of the buckle assembly 10A and the second connecting portion 213 of the tongue assembly 20A to form the six-point seat belt system having six fixing points.

With reference to FIGS. 6 to 12, the two webbings 2A, 2B are respectively inserted through the buckle assembly 10A and the tongue assembly 20A. An end of each one of the two webbings 2A, 2B is connected to a corresponding retractor 4. The other end of each one of the two webbings 2A, 2B is a fixing end and is connected to a corresponding webbing-fixing member. Tension of the two webbings 2A, 2B can change a relative position between the webbing-locking member 13 and the first frame portion 112 and a relative position between the webbing-fixing member 22 and the second frame portion 212 for respectively and uni-directionally locking the two webbings 2A, 2B. A height of the webbing-buckling device 1A on the webbings 2A, 2B can be adjusted. Lengths of the auxiliary webbings 3A, 3B can be adjusted by the adjusting members 6. The adjusting members 6 are known products. Detailed structure of each one of the adjusting members 6 will not be described herein.

With reference to FIGS. 6 to 12, 13, and 14, an occupant sits on the seat. When the occupant wants to adjust the height of the webbing-buckling device 1A, two hands of the occupant intuitionally and respectively hold the buckle base 11 of the buckle assembly 10A and the tongue base 21 of the tongue assembly 20A. The webbing-locking member 13 is pressed downwardly. A relative motion is generated between the first frame portion 112 and the webbing-locking member 13 for unlocking one of the webbings 2A. The webbing-fixing member 22 is pressed downwardly. A relative motion is generated between the second frame portion 212 and the webbing-fixing member 22 for unlocking the other one of the webbings 2B. Simultaneously, the buckle base 11 of the buckle assembly 10A and the tongue base 21 of the tongue assembly 20A are upwardly pushed by the occupant. The buckle assembly 10A and the tongue assembly 20A are adjusted to suitable positions on the webbings 2A, 2B by a stepless operation. When the hands of the occupant leave the webbing-buckling device 1A, tensions of the webbings 2A, 2B are respectively applied to the buckle assembly 10A and the tongue assembly 20A. The webbing-locking member 13 is pushed upwardly. One of the webbings 2A is re-locked by the first frame portion 112 and the webbing-locking member 13. The webbing-fixing member 22 is pushed upwardly. The other one of the webbings 2B is re-locked by the second frame portion 212 and the webbing-fixing member 22. The webbings 2A, 2B are locked automatically by friction generated by the webbing-buckling device 1A.

With reference to FIGS. 1, 2, and 6 to 12, the occupant sits on the seat in the vehicle. The tongue portion 211 in the tongue assembly 20A is inserted into the buckle assembly 10A and is locked by the locking assembly 12. The webbing-buckling device 1A is located in front of a torso of the occupant. When the six-point seat belt system is correctly locked, the inclining locking mechanism disposed in each one of the retractors 4 is locked, or the retractors 4 are locked due to emergency deceleration or brake, the relative position between the webbing-locking member 13 and the first frame portion 112 and the relative position between the webbing-fixing member 22 and the second frame portion 212 are changed by the tensions of the webbings 2A, 2B for locking the webbings 2A, 2B unidirectionally and respectively. One of the webbings 2A is locked between the webbing-locking member 13 and the first frame portion 112. The other one of the webbings 2B is locked between the webbing-fixing member 22 and the second frame portion 212. The webbings 2A, 2B are locked. The webbings 2A, 2B fastened on the occupant are tighter and tighter for restricting the occupant on the seat and increasing the security of the occupant on the seat.

When the webbing-buckling device 1A can be applied to a four-point seat belt system without a retractor or a six-point seat belt system without a retractor, the assemblies in the four-point seat belt system without the retractor or the six-point seat belt system without the retractor are similar to the assemblies in the four-point seat belt system having the at least one retractor 4 or the six-point seat belt system having the at least one retractor 4. With reference to FIGS. 16 to 19, the difference is as follows. The two webbings 2A, 2B are not connected to the at least one retractor 4 and are connected to two adjusting members 6 respectively. Ends of the two weddings 2A, 2B are respectively inserted through two top rings 5 disposed on two opposite top sides of the seat back and are fixed on a back side of the seat back. The lengths of the two webbings 2A, 2B can be adjusted by the adjusting members 6 to fit occupants with different builds.

The relative position between the webbing-locking member 13 and the first frame portion 112 and the relative position between the webbing-fixing member 22 and the second frame portion 212 are changed by the tensions of the webbings 2A, 2B for locking the webbings 2A, 2B unidirectionally and respectively. One of the webbings 2A is locked between the webbing-locking member 13 and the first frame portion 112. The other one of the webbings 2B is locked between the webbing-fixing member 22 and the second frame portion 212. The webbings 2A, 2B are locked. The webbings 2A, 2B fastened on the occupant are tighter and tighter for restricting the occupant on the seat and increasing the security of the occupant on the seat.

Figure 20:
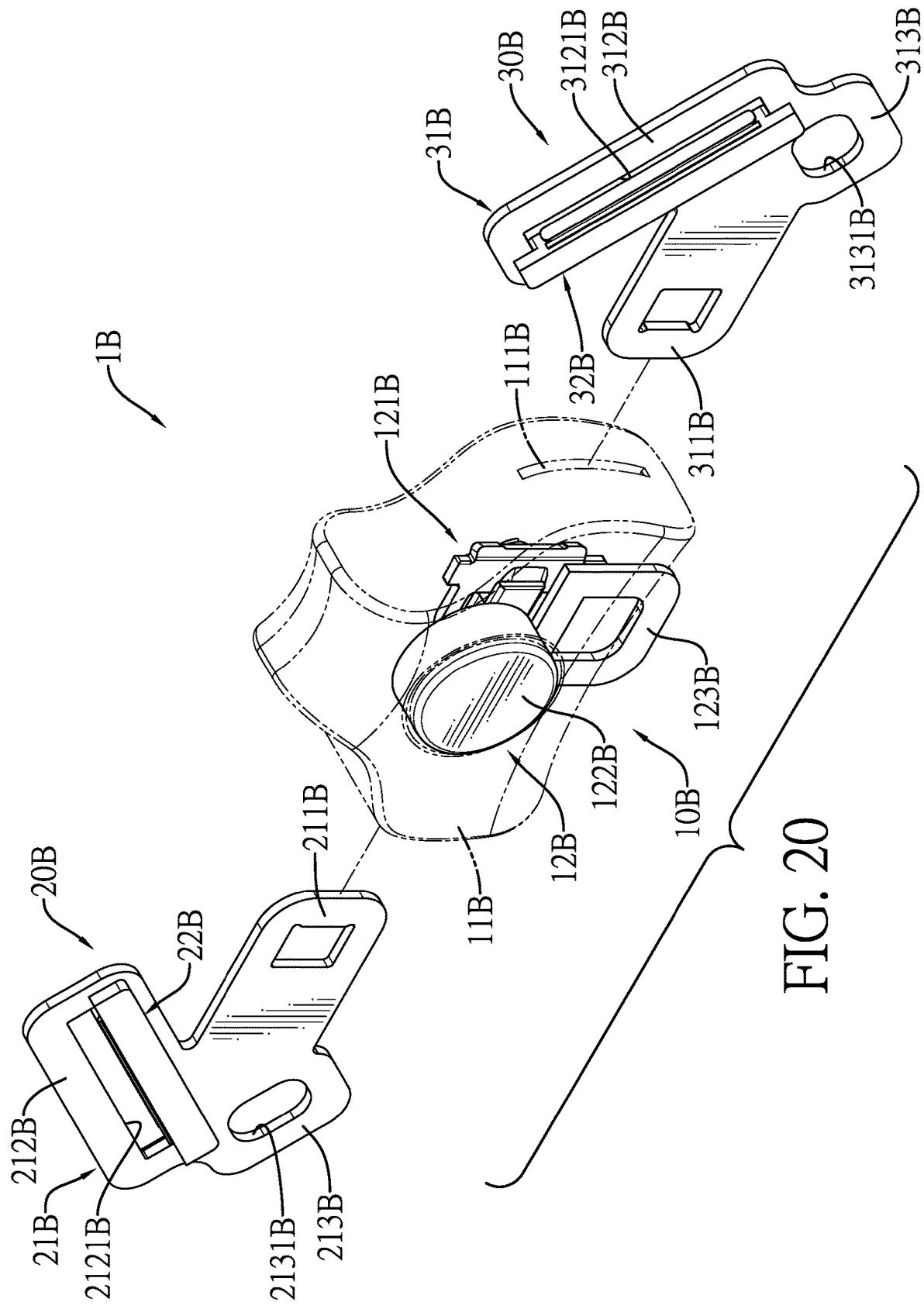
FIG. 20 is an exploded perspective view of a second embodiment of a webbing-buckling device of a multi-point seat belt system in accordance with the present invention, showing the webbing-buckling device is unlocked.
Figure 21:
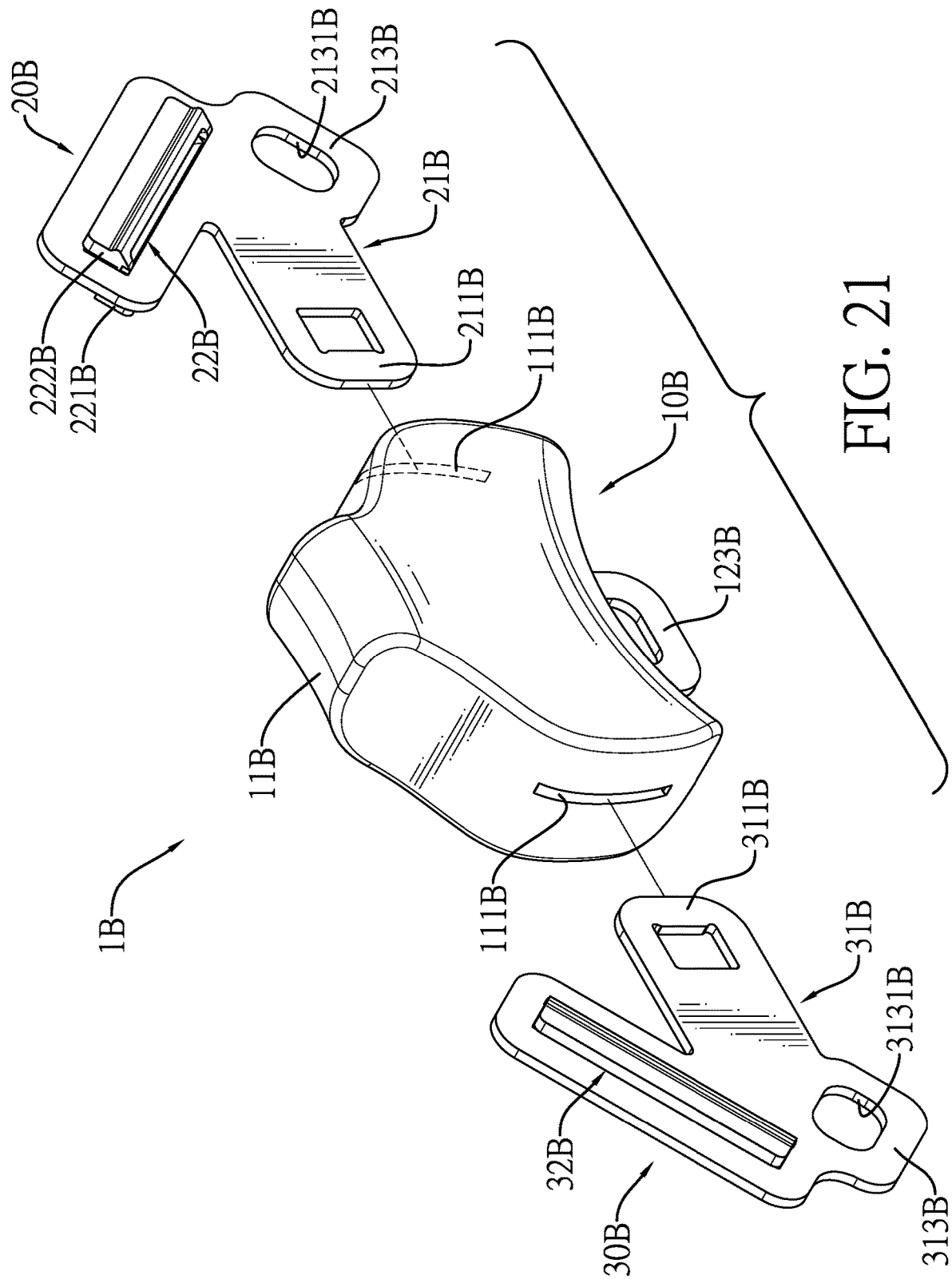
FIG. 21 is another exploded perspective view of the webbing-buckling device in FIG. 20.
Figure 22:
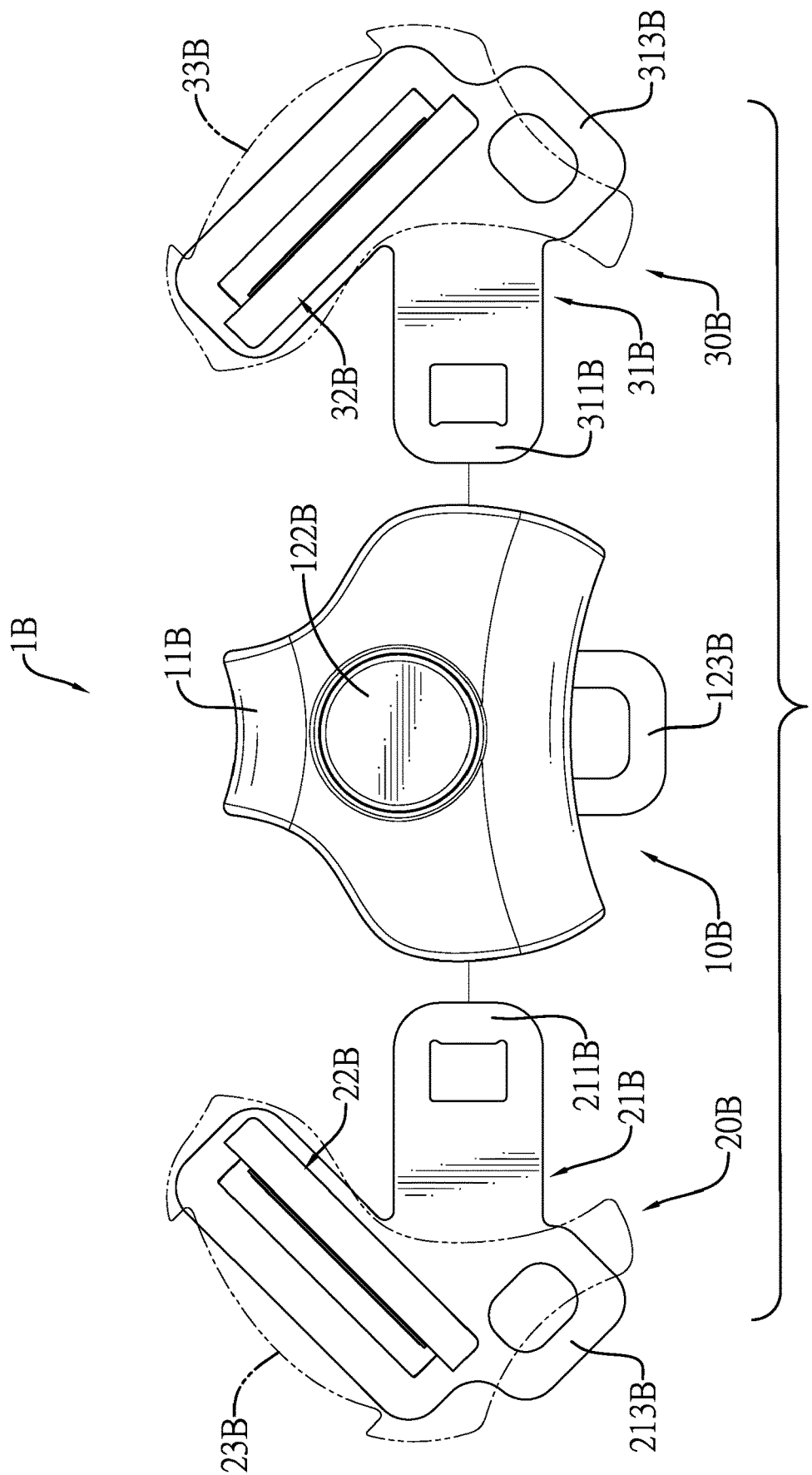
FIG. 22 is a front side view of the webbing-buckling device in FIG. 20, showing a tongue shell is disposed around a tongue assembly.

With reference to FIGS. 20 to 22, in a second embodiment of the present invention, the webbing-buckling device 1B has a buckle assembly 10B and two tongue assemblies 20B, 30B.

With reference to FIGS. 20 to 22, the buckle assembly 10B has a central shell 11B, two tongue slots 111B, a webbing-connecting portion 123B, and a locking assembly 12B. The central shell 11B has two opposite sides and a bottom. The two tongue slots 111B are respectively formed through the two opposite sides of the central shell 11B. The webbing-connecting portion 123B is disposed on the bottom of the central shell 11B. The locking assembly 12B is disposed in the central shell 11B and has a locking mechanism 121B and a pressing member 122B. The locking mechanism 121B is disposed in the central shell 11B. The pressing member 122B is disposed on the locking mechanism 121B. The pressing member 122B selectively drives the locking mechanism 121B to change to an unlocked state. The locking assembly 12B can be a known product. The locking assembly 12B is not an improved part in the present invention. Detailed structures of the locking assembly 12B will not be described herein.

With reference to FIGS. 20 to 22, structures of the tongue assemblies 20B, 30B in the first embodiment and the second embodiment are the same. The two tongue assemblies 20B, 30B are symmetric in shape. Each one of the two tongue assemblies 20B, 30B has a tongue base 21B, 31B and a webbing-fixing member 22B, 32B. The tongue base 21B, 31B is made of a rigid material and has a tongue portion 211B, 311B and a second frame portion 212B, 312B. The second frame portion 212B, 312B is formed on an end of the tongue portion 211B, 311B and has a second through hole 2121B, 3121B formed through the second frame portion 212B, 312B. The webbing-fixing member 22B, 32B is inserted through the second through hole 2121B, 3121B of the second frame portion 212B, 312B of the tongue base 21B, 31B. The webbing-fixing member 22B, 32B is able to move relative to the second frame portion 212B, 312B. The two tongue assemblies 20B, 30B are able to lock the two webbings 2A, 2B respectively. The tongue portions 211B, 311B of the tongue base 21B, 31B of the two tongue assemblies 20B, 30B are respectively and selectively inserted into the tongue slots 111B of the buckle assembly 10B for locking or unlocking simultaneously.

With reference to FIGS. 20 to 22, in each one of the two tongue assemblies 20B, 30B, the tongue base 21B, 31B has a second connecting portion 213B, 313B. The second connecting portion 213B, 313B is formed below the second frame portion 212B, 312B and has a second connecting hole 2131B, 3131B formed through the second connecting portion 213B, 313B.

With reference to FIG. 22, each one of the two tongue assemblies 20B, 30B has a tongue shell 23B, 33B. The tongue shell 23B, 33B covers the tongue base 21B, 31B.

The structures of the tongue bases 21, 21B, 31B in the first embodiment and the second embodiment are the same. The structures of the webbing-fixing members 22, 22B, 32B in the first embodiment and the second embodiment are the same. Detailed structures of the tongue bases 21B, 31B and the webbing-fixing members 22B, 32B will not be described herein.

Figure 23:
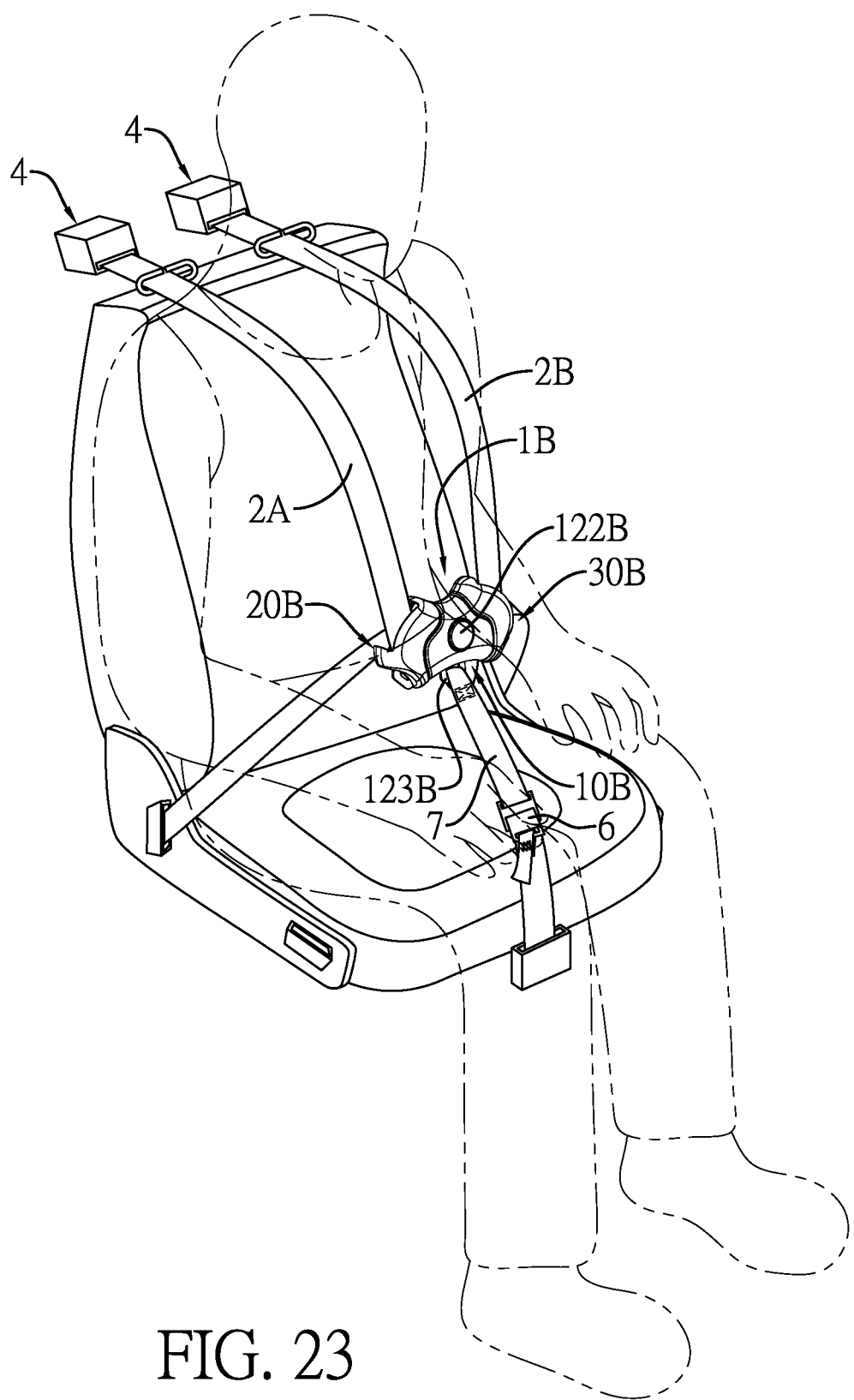
FIG. 23 is an operational perspective view of the webbing-buckling device in FIG. 20, showing the webbing-buckling device is applied to a five-point seat belt system on a seat of a vehicle.
Figure 24:
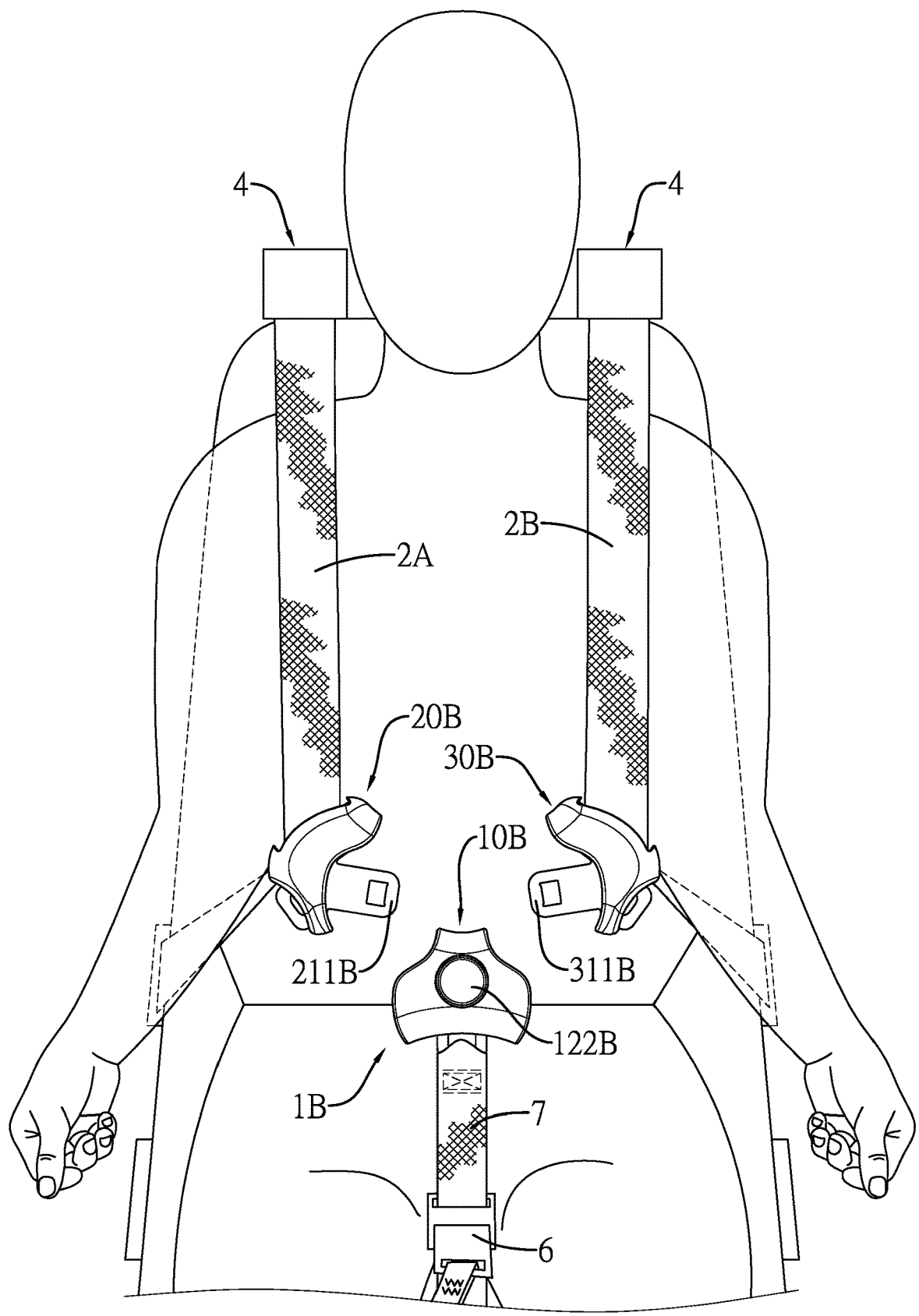
FIG. 24 is a front side view of the webbing-buckling device in FIG. 23, showing the webbing-buckling device is unlocked.
Figure 25:
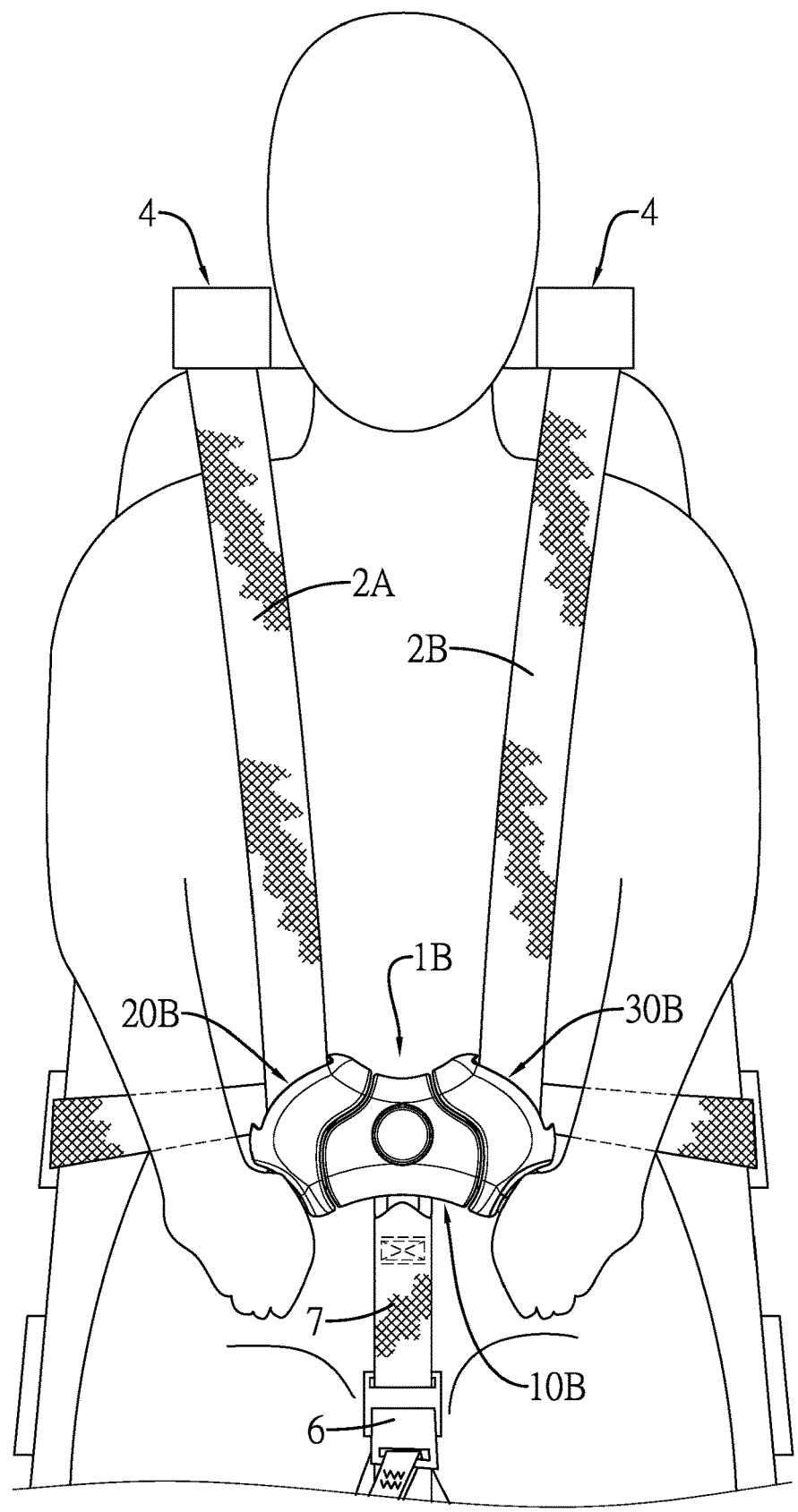
FIG. 25 is a front side view of the webbing-buckling device in FIG. 23, showing the webbing-buckling device is locked.
Figure 26:
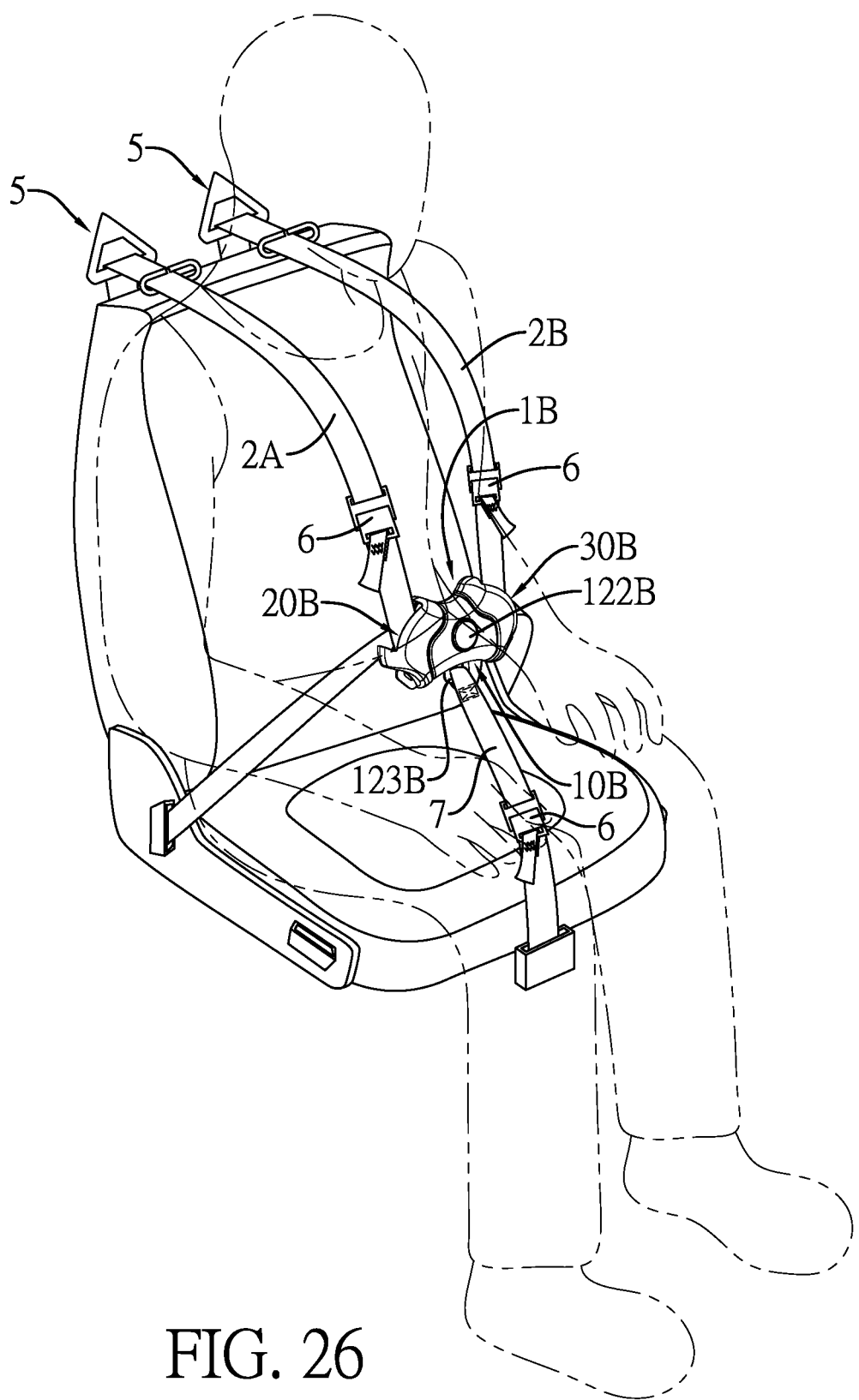
FIG. 26 is an operational perspective view of a five-point seat belt system without a retractor, showing the webbing-buckling device in FIG. 20 is applied to the five-point seat belt system without the retractor.
Figure 27:
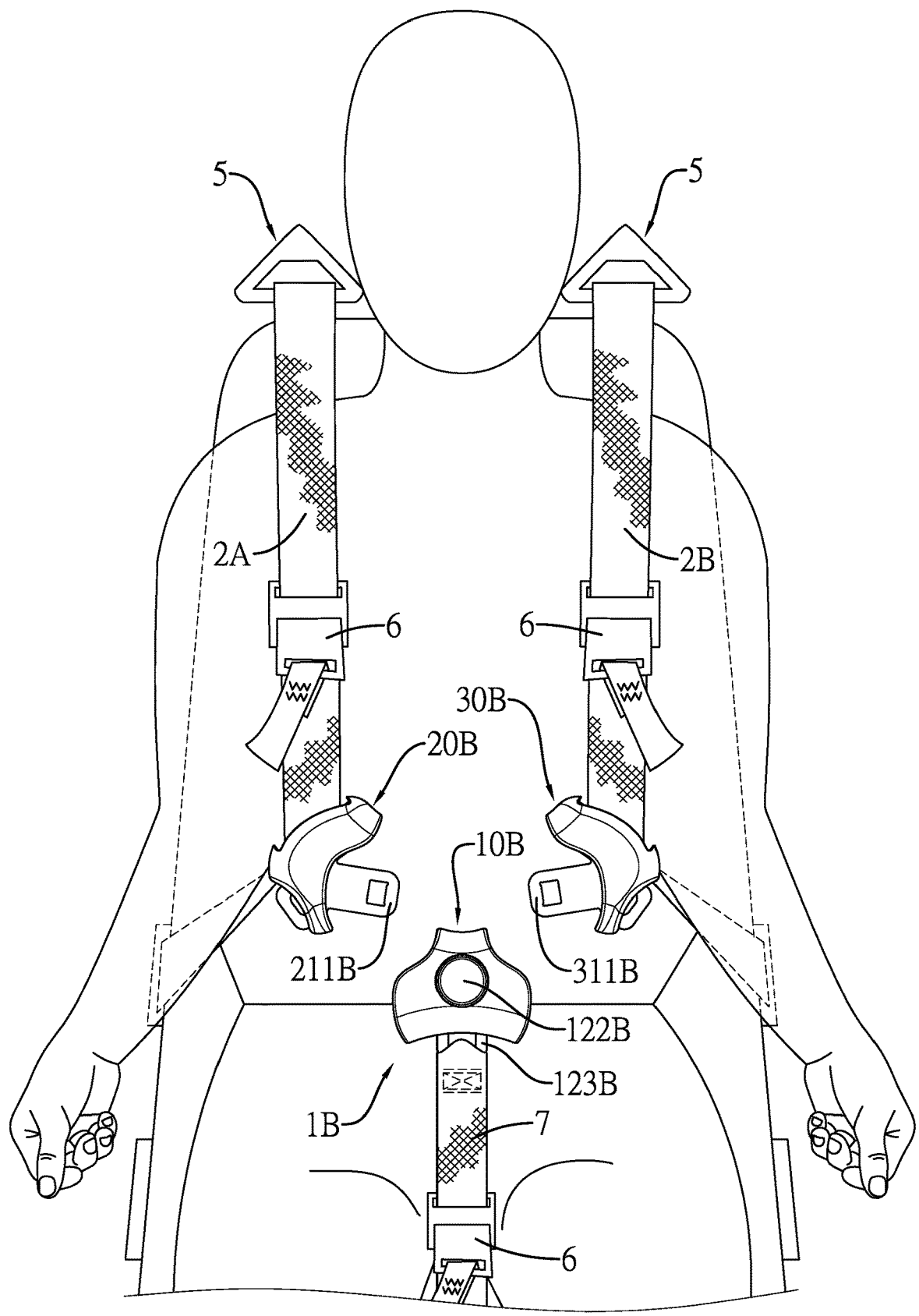
FIG. 27 is a front side view of the five-point seat belt system without the retractor in FIG. 26, showing the webbing-buckling device is unlocked.

With reference to FIGS. 23 to 25, the webbing-buckling device 1B can be applied to a five-point seat belt system having at least one retractor 4. Furthermore, the webbing-buckling device 1B can be applied to a seven-point seat belt system having at least one retractor. With reference to FIGS. 26 to 27, the webbing-buckling device 1B can be applied to a five-point seat belt system without a retractor. Furthermore, the webbing-buckling device can be applied to a seven-point seat belt system without a retractor.

With reference to FIGS. 23 to 25, the webbing-buckling device 1B can be applied to the five-point seat belt system having at least one retractor 4. The at least one retractor 4 can be one or two retractors. Each one of the at least one retractor 4 is disposed on a seat back of a seat in a vehicle, can retract a webbing automatically, and has an inclining locking mechanism disposed in each one of the at least one retractor 4. When the vehicle is inclined, the webbing 2A, 2B is locked by the inclining locking mechanism. The at least one retractor 4 is a known product. Detailed structure of the at least one retractor 4 will not be described herein.

With reference to FIGS. 23 to 25, the at least one retractor 4 is one, is disposed below the seat back of the seat, and is connected to a Y-shaped webbing member. Two webbings 2A, 2B of the Y-shaped webbing member are respectively inserted through the buckle assembly 10B and the tongue assemblies 20B, 30B of the webbing-buckling device 1B. Distal ends of the two webbings 2A, 2B are respectively connected to two fixing members located at the opposite back sides of a cushion in the seat. When the at least one retractor 4 is two, the two retractors 4 are respectively disposed on the opposite top-back sides of the seat back and are respectively connected to the two webbings 2A, 2B. The two webbings 2A, 2B are respectively inserted through the two tongue assemblies 20B, 30B. Distal ends of the two webbings 2A, 2B are respectively connected to the two fixing members located at the opposite back sides of the cushion in the seat. The webbing-connecting portion 123B is connected to an auxiliary webbing 7 having an adjusting member 6. The auxiliary webbing 7 is connected to a front center of the seat to form a fixing point. In addition, two opposite front sides of the seat are respectively two auxiliary webbings having adjusting members. The two auxiliary webbings are respectively connected to the second connecting portions 213B, 313B in the two tongue assemblies 20B, 30B to form the seven-point seat belt system having seven fixing points.

The second embodiment of the webbing-buckling device 1B is applied to the multi-point seat belt system. Assemblies of the two tongue assemblies 20B, 30B and the webbings 2A, 2B are the same as assemblies of the tongue assembly 20A and the webbings 2A, 2B and will not be described herein.

When an occupant sits on the seat, the occupant may want to adjust the height of the webbing-buckling device 1B. The height adjustments of the webbing-buckling device 1A, 1B in the first embodiment and the second embodiment are the same and will not be described herein.

Figure 13:
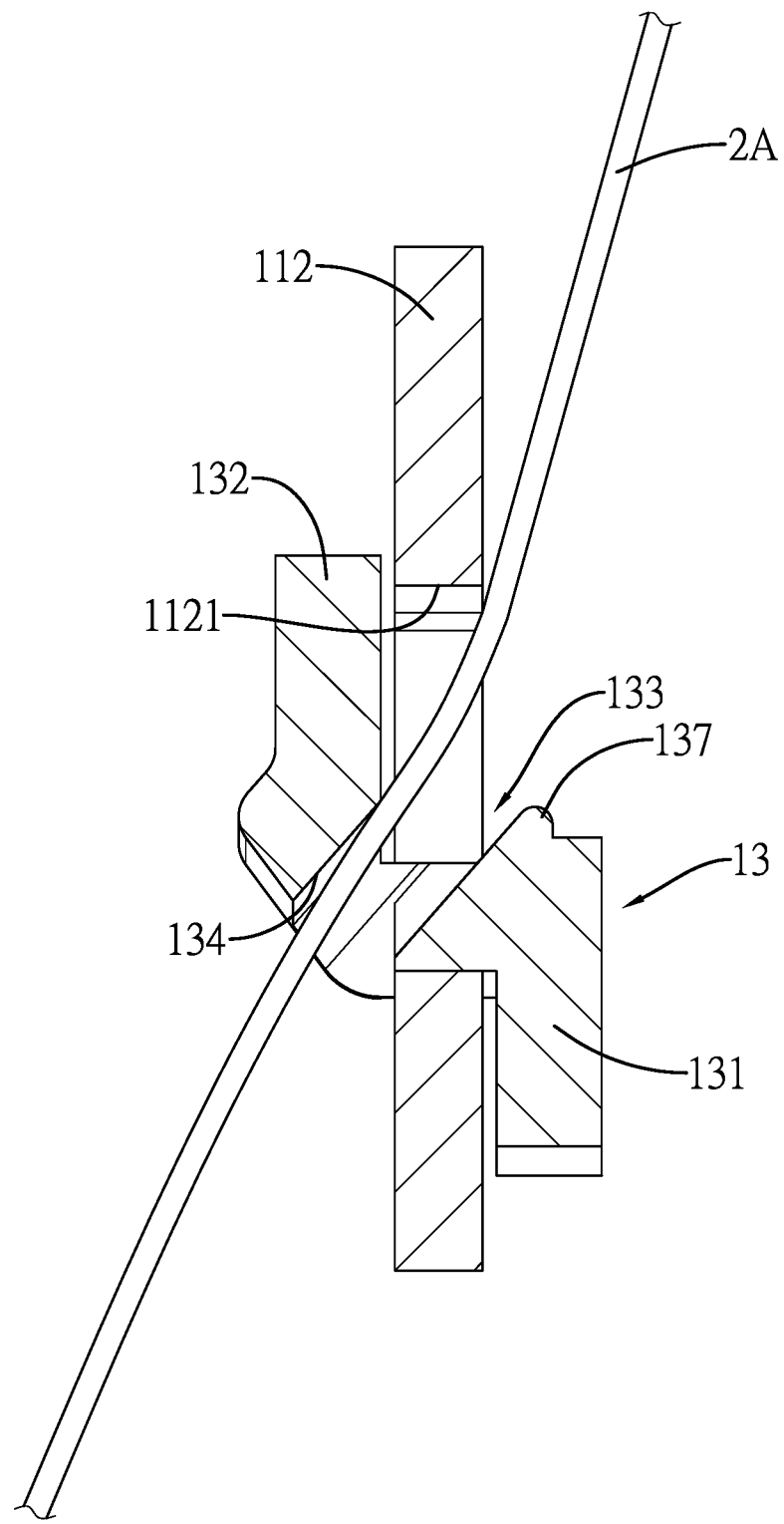
FIG. 13 is an enlarged side view in partial section of the webbing-buckling device in FIG. 10, showing a webbing is inserted through a first frame portion and a webbing-locking member, showing the webbing-buckling device is unlocked.
Figure 14:
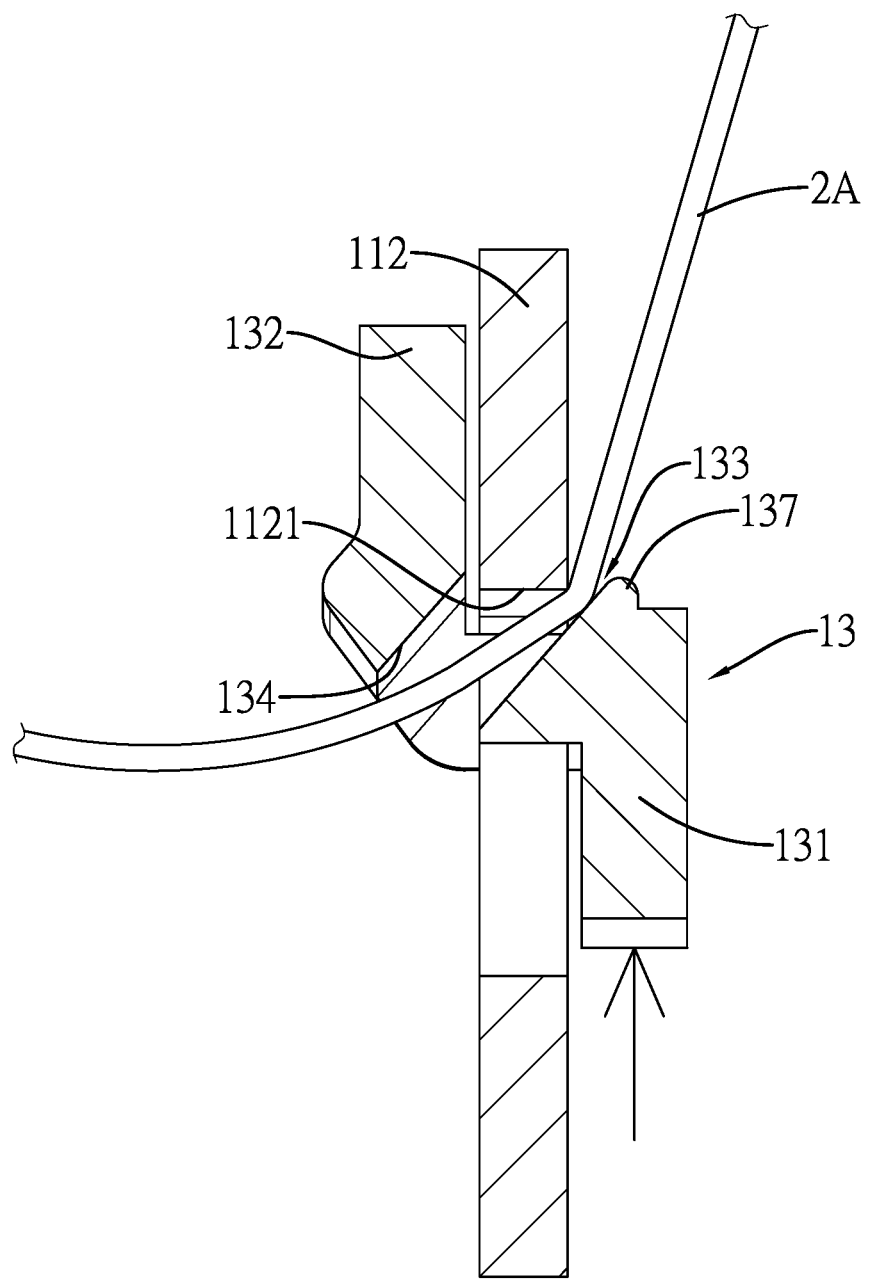
FIG. 14 is an enlarged side view in partial section of the webbing-buckling device in FIG. 10, showing the webbing is fixed between the first frame portion and the webbing-locking member.
Figure 15:
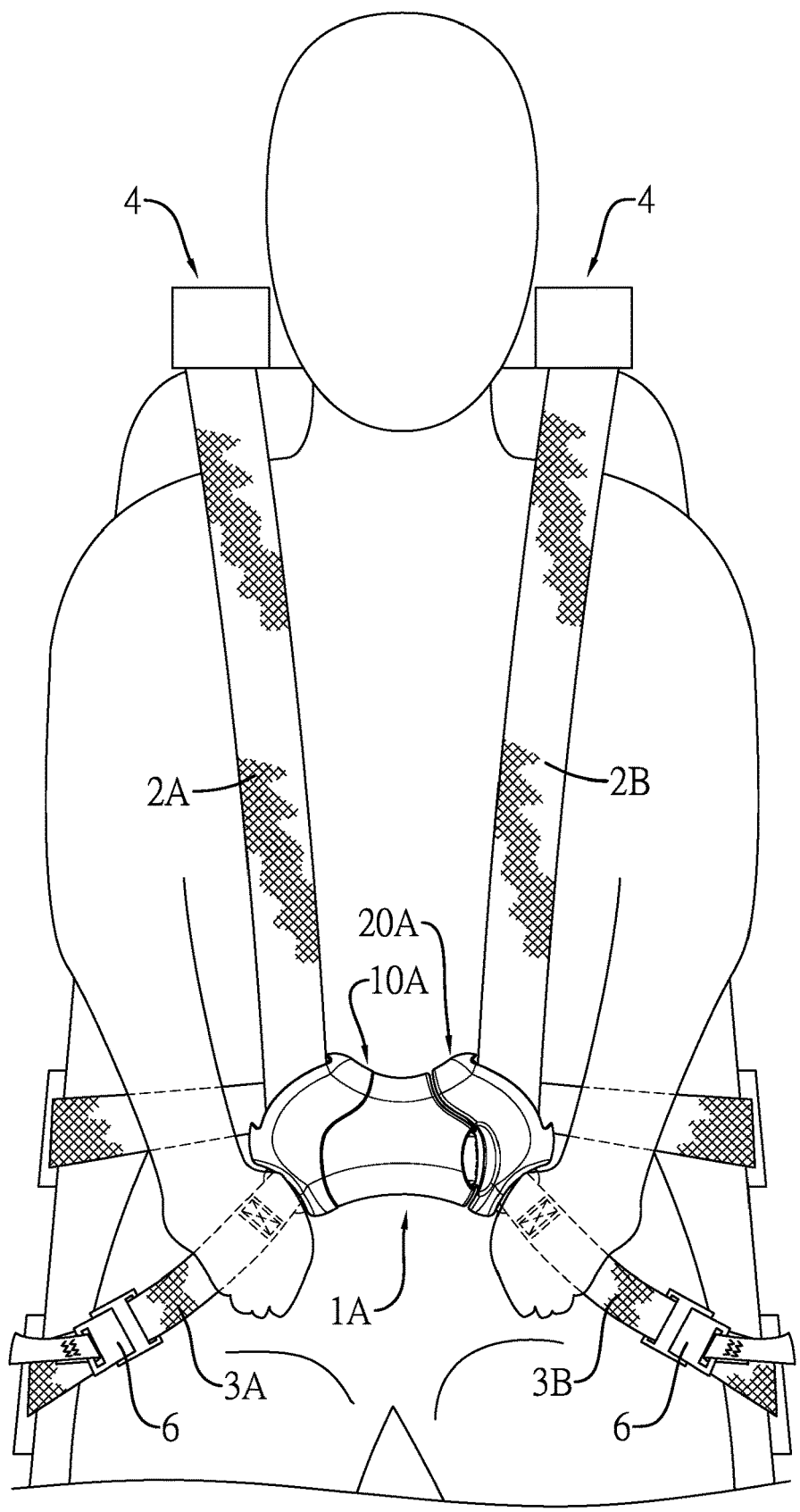
FIG. 15 is another front side view of the webbing-buckling device in FIG. 9, showing the webbing-buckling device is locked.
Figure 28:
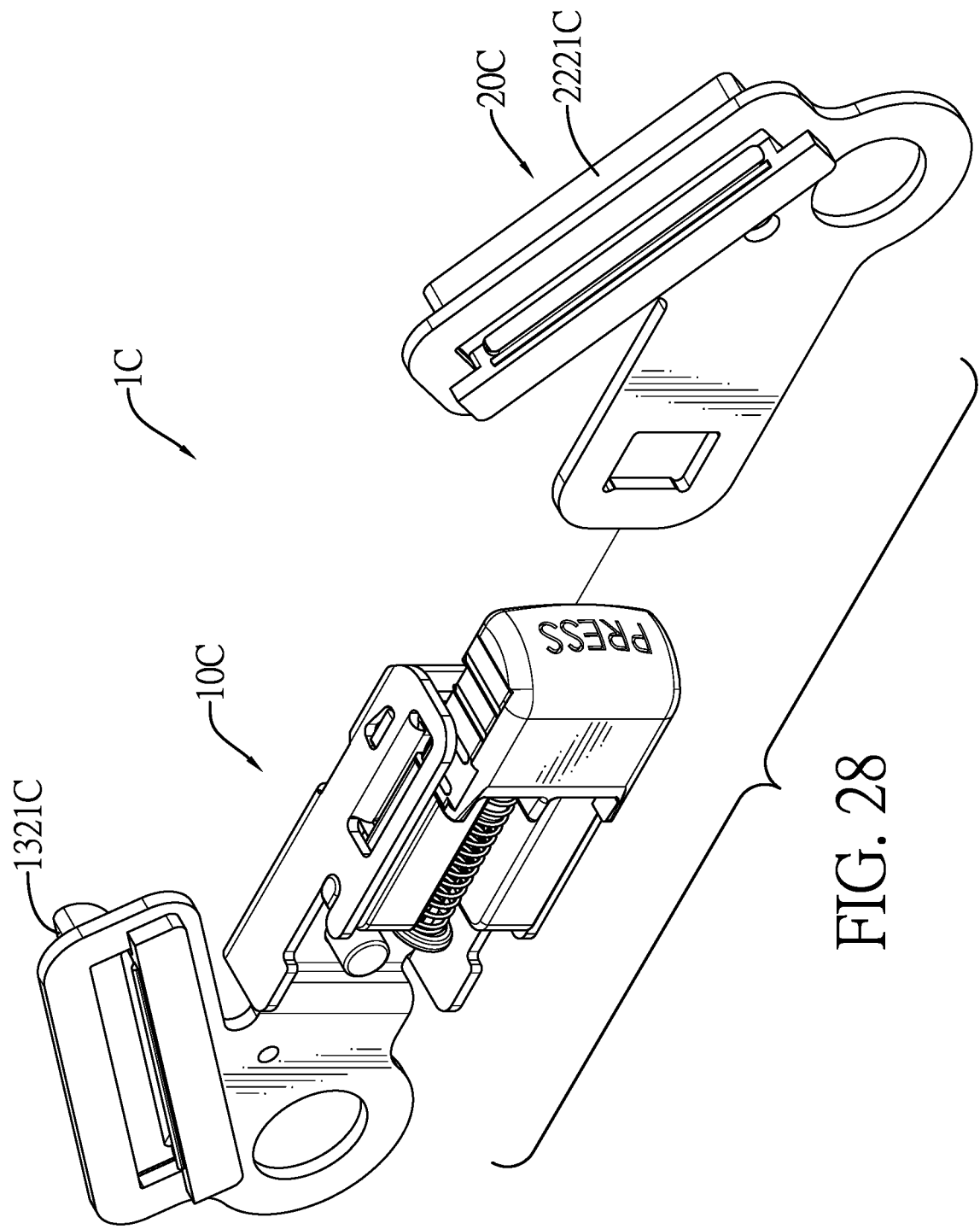
FIG. 28 is an exploded perspective view of a third embodiment of a webbing-buckling device of a multi-point seat belt system in accordance with the present invention, showing the webbing-buckling device is unlocked.
Figure 29:
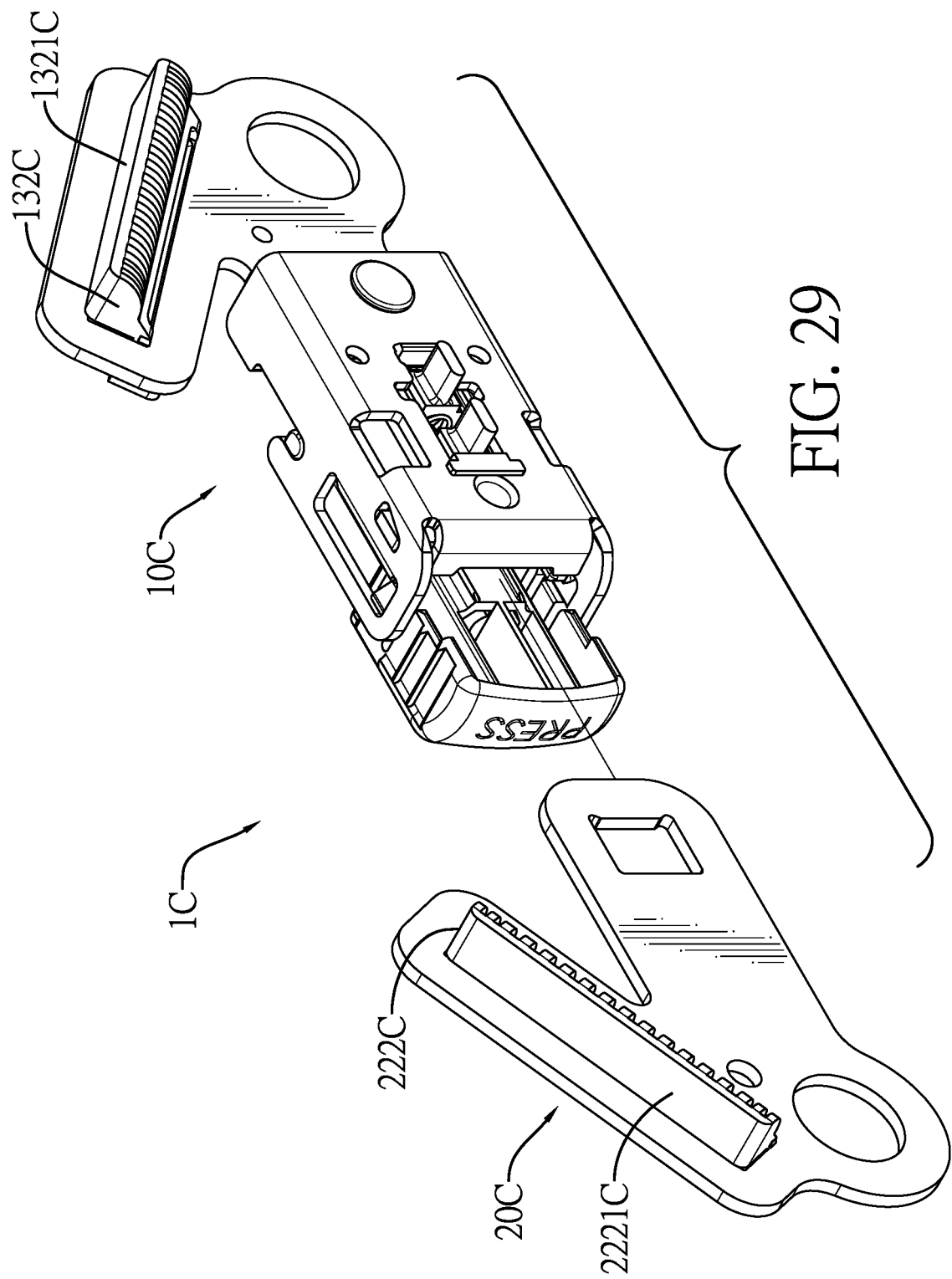
FIG. 29 is another exploded perspective view of the webbing-buckling device in FIG. 28.
Figure 32:
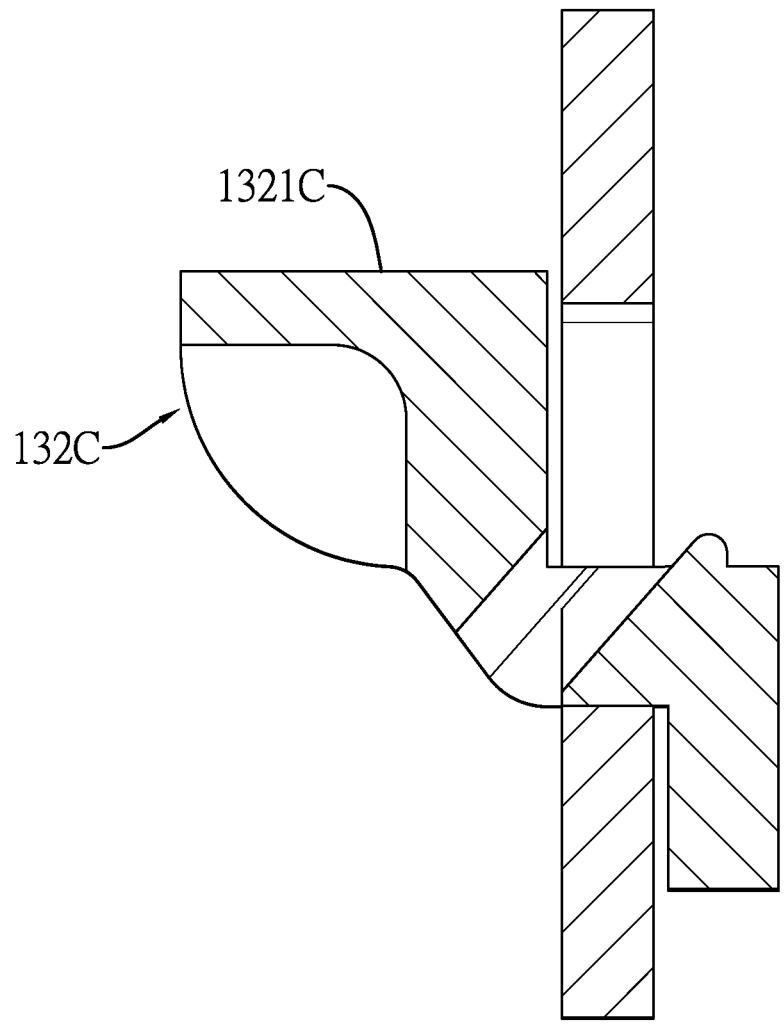
FIG. 32 is an enlarged side view in partial section of the webbing-buckling device in FIG. 31, showing a webbing is inserted through a first frame portion and a webbing-locking member.

With reference to FIGS. 28 to 29, in a third embodiment of a webbing-buckling device 1C has a buckle assembly 10C and a tongue assembly 20C. The buckle assemblies 10A, 10C of the webbing-buckling devices 1A, 1C in the first embodiment and the third embodiment are almost same and will not be described herein. A difference between the buckle assemblies 10A, 10C in the first embodiment and the third embodiment is in the structures of the second side plate portions 132 in the first embodiment and the third embodiment. With reference to FIGS. 13 and 32, a top surface area 1321C of the second side plate portion 132C in the third embodiment is larger than a top surface area of the second side plate portion 132 in the first embodiment for pressing easily.

Figure 30:
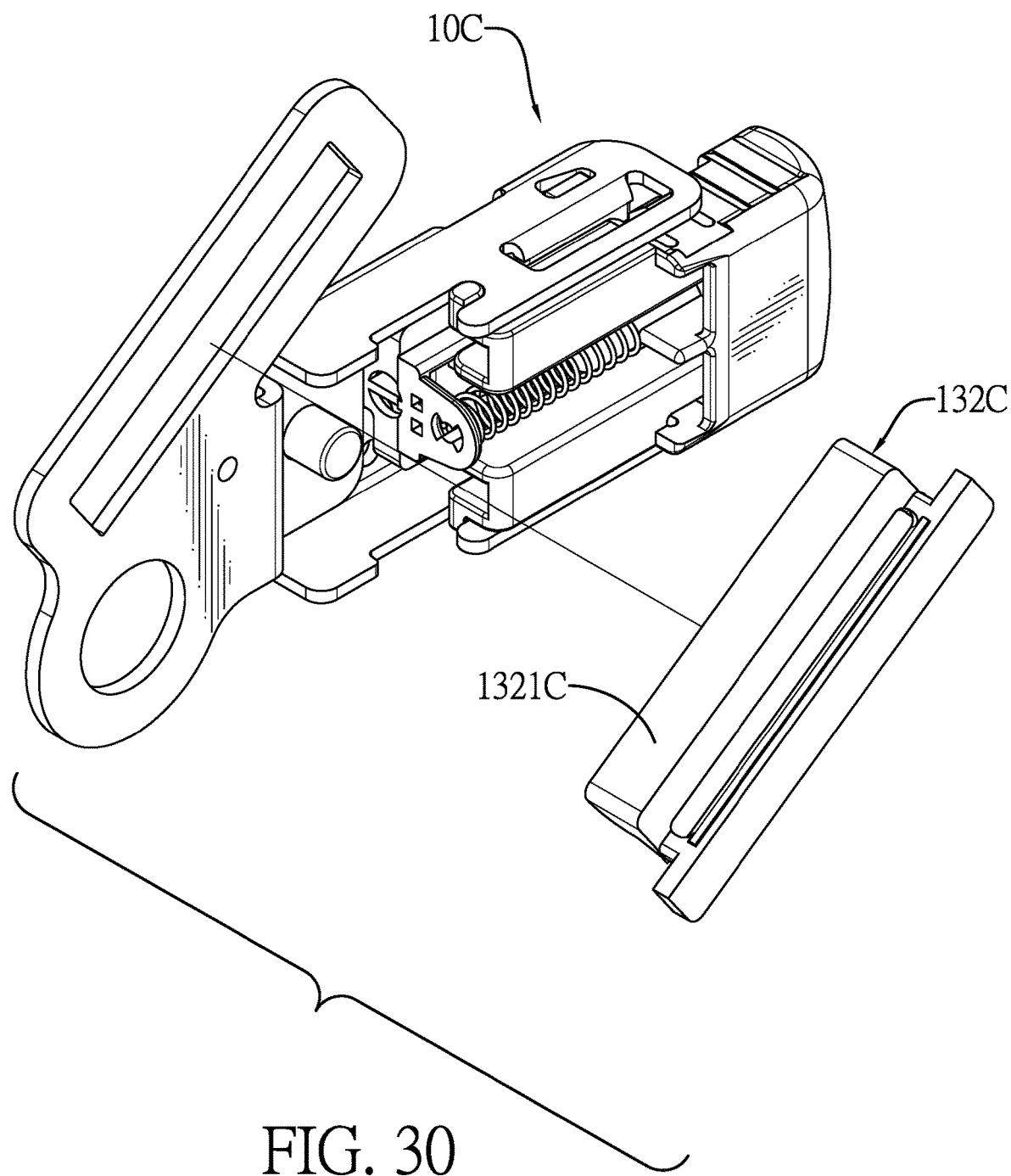
FIG. 30 is an enlarged and exploded perspective view of the webbing-buckling device in FIG. 28.
Figure 31:
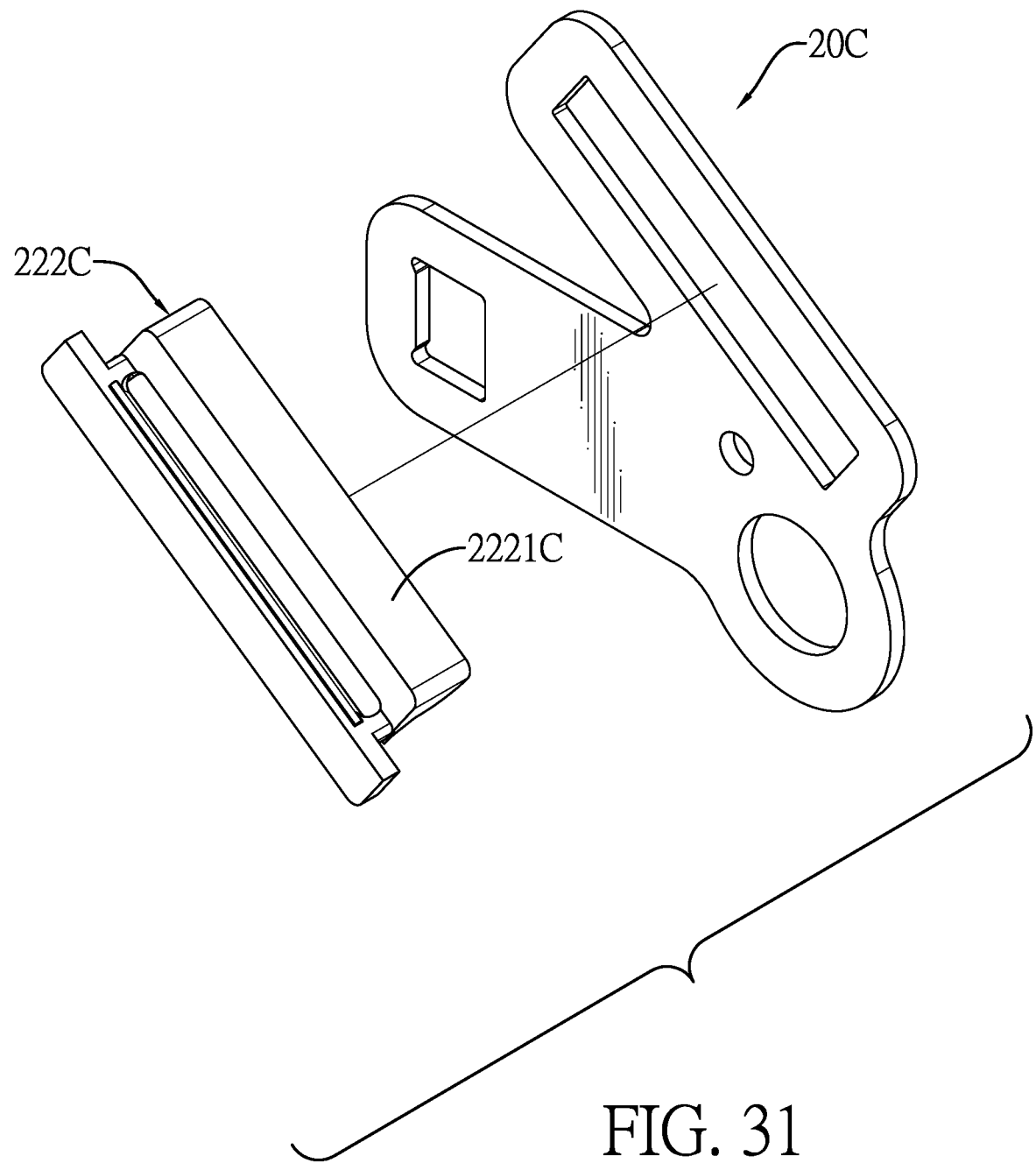
FIG. 31 is another enlarged and exploded perspective view of the webbing-buckling device in FIG. 28.

With reference to FIGS. 30 and 31, the tongue assemblies 20C of the webbing-buckling devices 1A, 1C in the first embodiment and the third embodiment are almost same and will not be described herein. A difference between the tongue assemblies 20 in the first embodiment and the third embodiment is in the structures of the second side plate portions 222, 222C in the first embodiment and the third embodiment. A top surface area 2221C of the second side plate portion 222C in the third embodiment is larger than a top surface area of the second side plate portion 222 in the first embodiment for pressing easily.

When the webbing-buckling device 1A is applied to the multi-point seat belt system on the seat of the vehicle, the webbing-buckling device 1A is selectively connected to the two webbings 2A, 2B of the multi-point seat belt system. When the webbing-buckling device 1A has one buckle assembly 10A and one tongue assembly 20A, the webbing-locking member 13 is slidably inserted into the first frame portion 112 of the buckle base 11. The webbing-fixing member 22 is slidably inserted into the second frame portion 212 of the tongue base 21. One of the two webbings is inserted between the first frame portion 112 of the buckle assembly 10A and the webbing-locking member 13. The other one of the two webbings is inserted between the second frame portion 212 of the tongue assembly 20A and the webbing-fixing member 22. The one buckle assembly 10A and the one tongue assembly 20A are connected between the two webbings 2A, 2B. When the webbing-buckling device 1B has one buckle assembly 10B and two tongue assemblies 20B, 30B, the webbing-fixing members 22B, 32B are respectively inserted through the second frame portions 212B, 312B of the two tongue assemblies 20B, 30B. The two webbings 2A, 2B are respectively inserted through the two tongue assemblies 20B, 30B having the webbing-fixing members 22B, 32B. The one buckle assembly 10B and the two tongue assemblies 20B, 30B are connected between the two webbings 2A, 2B. Therefore, the webbing-buckling device 1B is applied between the two webbings 2A, 2B of the multi-point seat belt system for providing effects on connecting, height adjusting, and locking.

Furthermore, when the webbing-buckling device 1A is combined by the buckle assembly 10A and the tongue assembly 20A, the structure of the webbing-locking member 13 and the structure of the webbing-fixing member 22 are simplified. The first side plate portion 131 and the second side plate portion 132 of the webbing-locking portion 13 are respectively located at the two opposite sides of the first frame portion 112. The first side plate portion 221 and the second side plate portion 222 of the webbing-fixing member 22 are respectively located at the two opposite sides of the second frame portion 212. The webbing-locking member 13 and the webbing-fixing portion 22 are inserted through and are able to slide in the first frame portion 112 in the buckle assembly 10A and the second frame portion 212 in the tongue assembly 20A respectively.

Alternatively, the webbing-buckling device 1B is combined by the buckle assembly 10B and the two tongue assemblies 20B, 30B. The structures of the webbing-fixing members 22B, 32B of the two tongue assemblies 20B, 30B are simplified. The first side plate portion 221B and the second side plate portion 222B of each one of the webbing-fixing members 22B, 32B are respectively located at the two opposite sides of the corresponding second frame portions 212B, 312B. Each one of the webbing-fixing members 22B, 32B is directly inserted through and is able to slide in the corresponding second frame portions 212B, 312B. The structure of the webbing-buckling device is simplified for ease in manufacturing.

What is claimed is:

1. A webbing-buckling device of a multi-point seat belt system applied to connect to two webbings of the multi-point seat belt system, the webbing-buckling device comprising:
    a buckle assembly having
        a buckle base made of a rigid material and having a body and a first frame portion, the first frame portion formed on an end of the body and having a first through hole formed through the first frame portion;
        a locking assembly disposed on the body of the buckle base and having a locking mechanism, a pressing member, and a tongue slot, the locking mechanism disposed on the body of the buckle base, the pressing member disposed on the locking mechanism, and the tongue slot formed on an end of the locking assembly opposite to the first frame portion, wherein the pressing member selectively drives the locking mechanism to change to an unlocked state; and
        a webbing-locking member inserted through the first through hole of the first frame portion of the buckle base, wherein the webbing-locking member is able to move relative to the first frame portion for locking one of the two webbings; and
    a tongue assembly detachably disposed on the buckle assembly and having
        a tongue base made of a rigid material and having a tongue portion and a second frame portion, the second frame portion formed on an end of the tongue portion and having a second through hole formed through the second frame portion; and
        a webbing-fixing member inserted through the second through hole of the second frame portion of the tongue base, wherein the webbing-fixing member is able to move relative to the second frame portion for locking the other one of the two webbings, the tongue portion of the tongue base of the tongue assembly is selectively inserted into the tongue slot of the locking assembly of the buckle assembly for locking.

2. The webbing-buckling device of the multi-point seat belt system as claimed in claim 1, wherein
    each one of the webbing-locking member and the webbing-fixing member has
        a first side plate portion;
        a second side plate portion being opposite to the first side plate portion at a spaced interval, wherein the first side plate portion and the second side plate portion have a height difference; and
        a through portion located between the first side plate portion and the second side plate portion and having
            a through groove downwardly and inclinedly extending from the first side plate portion to the second side plate portion and having two side edges; and
            two walls respectively located at the two side edges of the through groove and both connected to the first side plate portion and the second side plate portion, wherein each one of the two walls has an outer surface and a slide groove formed on the outer surface, extending longitudinally, and located between the first side plate portion and the second side plate portion, the first side plate portion has a top edge and a flange, and the flange is formed on and protrudes from the top edge of the first side plate portion;
    the first frame portion of the buckle base has two first sides formed on two ends of the first through hole respectively, the through portion of the webbing-locking member is inserted through the first through hole of the first frame portion, the first side plate portion and the second side plate portion of the webbing-locking member are respectively located at two opposite sides of the first frame portion, the two first sides of the first frame portion are respectively inserted into the slide grooves of the two walls in the webbing-locking member, the through portion of the webbing-locking member is limited by the first through hole of the first frame portion, and the webbing-locking member is able to slide in the first frame portion; and
    the second frame portion of the tongue base has two second sides formed on two ends of the second through hole respectively, the through portion of the webbing-fixing member is inserted through the second through hole of the second frame portion, the first side plate portion and the second side plate portion of the webbing-fixing member are respectively located at two opposite sides of the second frame portion, the two second sides of the second frame portion are respectively inserted into the slide grooves of the two walls in the webbing-fixing member, the through portion of the webbing-fixing member is limited by the second through hole of the second frame portion, and the webbing-fixing member is able to slide in the second frame portion.

3. The webbing-buckling device of the multi-point seat belt system as claimed in claim 2, wherein
the buckle assembly has an outer shell, and the outer shell of the buckle assembly covers the body of the buckle base and the locking mechanism of the locking assembly; and
the tongue assembly has a tongue shell, and the tongue shell of the tongue assembly covers the tongue base.

4. The webbing-buckling device of the multi-point seat belt system as claimed in claim 1, wherein
the buckle base of the buckle assembly has a first connecting portion, and the first connecting portion is formed below the first frame portion and has a first connecting hole formed through the first connecting portion; and
the tongue base of the tongue assembly has a second connecting portion, and the second connecting portion is formed below the second frame portion and has a second connecting hole formed through the second connecting portion.

5. The webbing-buckling device of the multi-point seat belt system as claimed in claim 2, wherein
the buckle base of the buckle assembly has a first connecting portion, and the first connecting portion is formed below the first frame portion and has a first connecting hole formed through the first connecting portion; and
the tongue base of the tongue assembly has a second connecting portion, and the second connecting portion is formed below the second frame portion and has a second connecting hole formed through the second connecting portion.

6. The webbing-buckling device of the multi-point seat belt system as claimed in claim 4, wherein
the buckle assembly has an outer shell, and the outer shell of the buckle assembly covers the body of the buckle base and the locking mechanism of the locking assembly; and
the tongue assembly has a tongue shell, and the tongue shell of the tongue assembly covers the tongue base.

7. The webbing-buckling device of the multi-point seat belt system as claimed in claim 5, wherein
the buckle assembly has an outer shell, and the outer shell of the buckle assembly covers the body of the buckle base and the locking mechanism of the locking assembly; and
the tongue assembly has a tongue shell, and the tongue shell of the tongue assembly covers the tongue base.

* * * * *